(12) United States Patent
Caine et al.

(10) Patent No.: US 8,866,641 B2
(45) Date of Patent: Oct. 21, 2014

(54) METHOD AND APPARATUS FOR CONTROLLING A KEYPAD OF A DEVICE

(75) Inventors: Michael E. Caine, Needham, MA (US); Theodore R. Arneson, Ivanhoe, IL (US); William N. Robinson, Sunnyvale, CA (US)

(73) Assignee: Motorola Mobility LLC, Libertyville, IL (US)

( * ) Notice: Subject to any disclaimer, the term of this patent is extended or adjusted under 35 U.S.C. 154(b) by 869 days.

(21) Appl. No.: 12/274,019

(22) Filed: Nov. 19, 2008

(65) Prior Publication Data

US 2009/0128376 A1    May 21, 2009

Related U.S. Application Data

(60) Provisional application No. 60/989,288, filed on Nov. 20, 2007.

(51) Int. Cl.
| | |
|---|---|
| H03M 11/00 | (2006.01) |
| G06F 3/0488 | (2013.01) |
| G06F 3/02 | (2006.01) |
| G06F 3/01 | (2006.01) |
| H04M 1/23 | (2006.01) |
| G06F 3/023 | (2006.01) |

(52) U.S. Cl.
CPC ............ *H04M 1/23* (2013.01); *G06F 3/04886* (2013.01); *G06F 3/0219* (2013.01); *G06F 3/016* (2013.01); *G06F 2203/04809* (2013.01); *G06F 3/0238* (2013.01)
USPC ............... 341/21; 341/33; 345/168; 345/173; 400/488; 400/491.3; 400/492

(58) Field of Classification Search
CPC . G06F 3/0238; G06F 3/04886; G06F 3/0426; G06F 3/0219
USPC .................. 341/20, 21, 22, 33; 345/168, 173; 400/488, 491.3, 482
See application file for complete search history.

(56) References Cited

U.S. PATENT DOCUMENTS

| | | | |
|---|---|---|---|
| 5,222,895 | A | 6/1993 | Fricke |
| 5,685,721 | A | 11/1997 | Decker |

(Continued)

FOREIGN PATENT DOCUMENTS

| | | | |
|---|---|---|---|
| EP | 1717667 A | | 11/2006 |
| GB | 2414188 A | | 11/2005 |

(Continued)

OTHER PUBLICATIONS

KIPO'S Notice of Preliminary Rejection (English Translation), Aug. 9, 2011, all pages.

(Continued)

*Primary Examiner* — Albert Wong

(57) ABSTRACT

A device (2600) includes a controllable skin texture (2606) defining a keypad (2610), a sensor (2602), and control logic (200). The sensor senses a proximity of a pointing element (2900) to a particular key (2800, 2808, 2902, 2908) of the keypad based on a user input. The control logic adjusts a height of the particular key with respect to another key of the keypad in response to the sensor sensing the proximity of the pointing element to the particular key. In one example, the device includes a display (2700) for displaying a plurality of keys (2612). The control logic adjusts visual characteristics of the particular key (2800, 2808, 2902, 2908) and an adjacent key (2802, 2810, 2904, 2910) with respect to each other and with respect to other keys of the plurality of keys in response to the sensor sensing the proximity of the pointing element to the particular key.

14 Claims, 15 Drawing Sheets

(56) References Cited

U.S. PATENT DOCUMENTS

| | | | |
|---|---|---|---|
| 5,727,391 A | 3/1998 | Hayward et al. | |
| 5,766,013 A | 6/1998 | Vuyk | |
| 6,107,995 A | 8/2000 | Dordick | |
| 6,109,922 A | 8/2000 | Litshcel et al. | |
| 6,169,538 B1 | 1/2001 | Nowlan et al. | |
| 6,215,417 B1 * | 4/2001 | Krass et al. | 341/20 |
| 6,292,573 B1 | 9/2001 | Zurek et al. | |
| 6,317,614 B1 | 11/2001 | Okada | |
| 6,320,496 B1 | 11/2001 | Sokoler et al. | |
| 6,608,617 B2 | 8/2003 | Hoffknecht et al. | |
| 6,678,534 B2 | 1/2004 | Ishigaki | |
| 6,752,551 B1 * | 6/2004 | Hagerman | 400/488 |
| 6,776,619 B1 | 8/2004 | Roberts et al. | |
| 6,781,284 B1 | 8/2004 | Pelrine et al. | |
| 6,881,063 B2 | 4/2005 | Yang | |
| 6,882,086 B2 | 4/2005 | Kornbluh et al. | |
| 6,892,081 B1 | 5/2005 | Elomaa | |
| 6,988,247 B2 | 1/2006 | Janevski | |
| 7,002,533 B2 | 2/2006 | Sayag | |
| 7,009,595 B2 | 3/2006 | Roberts et al. | |
| 7,064,472 B2 | 6/2006 | Pelrine et al. | |
| 7,148,875 B2 | 12/2006 | Rosenberg et al. | |
| 7,178,725 B2 | 2/2007 | Vayrynen et al. | |
| 7,292,227 B2 | 11/2007 | Fukumoto et al. | |
| 7,306,463 B2 | 12/2007 | Hanley | |
| 7,397,413 B2 | 7/2008 | Amineh | |
| 7,509,140 B2 | 3/2009 | Elomaa | |
| 7,769,394 B1 | 8/2010 | Zhu | |
| 7,876,199 B2 | 1/2011 | Caine | |
| 7,944,435 B2 * | 5/2011 | Rosenberg et al. | 345/173 |
| 7,957,765 B1 | 6/2011 | Causey et al. | |
| 8,027,705 B2 | 9/2011 | Kim et al. | |
| 8,044,937 B2 | 10/2011 | Shin et al. | |
| 2003/0048260 A1 | 3/2003 | Matusis | |
| 2003/0122779 A1 | 7/2003 | Martin et al. | |
| 2004/0029082 A1 | 2/2004 | Fournier et al. | |
| 2004/0038186 A1 | 2/2004 | Martin et al. | |
| 2004/0107080 A1 | 6/2004 | Deichmann et al. | |
| 2005/0057528 A1 | 3/2005 | Kleen | |
| 2005/0062881 A1 | 3/2005 | Caci et al. | |
| 2005/0184959 A1 | 8/2005 | Kompe et al. | |
| 2005/0219223 A1 | 10/2005 | Kotzin et al. | |
| 2005/0253643 A1 | 11/2005 | Inokawa et al. | |
| 2006/0046031 A1 | 3/2006 | Janevski | |
| 2006/0073821 A1 | 4/2006 | Rantapuska | |
| 2006/0103634 A1 | 5/2006 | Kim et al. | |
| 2006/0146009 A1 | 7/2006 | Syrbe et al. | |
| 2006/0161870 A1 | 7/2006 | Hotelling et al. | |
| 2006/0161871 A1 | 7/2006 | Hotelling et al. | |
| 2006/0192771 A1 | 8/2006 | Rosenberg et al. | |
| 2006/0197750 A1 | 9/2006 | Kerr et al. | |
| 2006/0238510 A1 | 10/2006 | Panotopoulos et al. | |
| 2007/0013677 A1 | 1/2007 | Rosenberg et al. | |
| 2008/0248248 A1 | 10/2008 | Caine | |
| 2008/0248836 A1 | 10/2008 | Caine | |
| 2008/0287167 A1 | 11/2008 | Caine | |
| 2009/0015560 A1 | 1/2009 | Robinson et al. | |
| 2009/0061949 A1 | 3/2009 | Chen | |
| 2009/0132093 A1 | 5/2009 | Arneson et al. | |
| 2010/0069890 A1 | 3/2010 | Graskov et al. | |

FOREIGN PATENT DOCUMENTS

| | | |
|---|---|---|
| JP | 06332601 | 12/1994 |
| JP | 2003084891 | 3/2003 |
| KR | 1020050055841 | 6/2005 |
| KR | 1020050106698 | 11/2005 |
| KR | 1020060027655 | 3/2006 |
| KR | 1020060096869 | 9/2006 |
| WO | WO 0199086 A | 12/2001 |
| WO | WO 2006108121 A | 10/2006 |

OTHER PUBLICATIONS

Patent Cooperation Treaty, International Preliminary Report on Patentability for International Application No. PCT/US2008/084111, Jun. 3, 2010, 6 pages.

Patent Cooperation Treaty, International Search Report and Written Opinion of the International Searching Authority for International Application No. PCT/US2008/084111, Jun. 24, 2009, 11 pages.

Pasquero, Jerome et al.; Haptically Enabled Handheld Information Display with Distributed Tactile Transducer; IEEE Transactions on Multimedia; Oct. 15, 2006; pp. 1-9.

Luk, Joseph et al.; A Role for Haptics in Mobile Interaction: Initial Design Using a Handheld Tactile Display Prototype; ACM; 2006; pp. 1-10.

Liu, Chang et al.; Scaling Laws of Microactuators and Potential Applications of Electroactive Polymers in MEMS; Proceedings of SPIE's 6th Annual Int'l Symposium; Mar. 1999; pp. 1-10.

Haga, Y. et al.; Medical and welfare applications of shape memory alloy microcoil actuators; Institute of Physics Publishing; Aug. 24, 2005; pp. S266-S272.

Takamiya, Makoto et al.; Lower Power and Flexible Braille Sheet Display with Organic FET's and Plastic Actuators; IEEE; 2006; pp. 1-4.

Moy, G. et al.; A Compliant Tactile Display for Teletaction; Proceedings of the 2000 IEEE; Apr. 2000; pp. 3409-3415.

Konyo, Masashi et al.; Artificial Tactile Feel Display Using Soft Gel Actuators; Proceedings of the 2000 IEEE; Apr. 2000; pp. 3416-3421.

Benali-Khoudja, Mohamed et al.; VITAL: A New Low-Cost VIbro-TActiLe Display System; Proceedings of the 2004 IEEE; Apr. 2004; pp. 721-726.

Velazquez, Ramiro et al.; A Low-Cost Highly-Portable Tactile Display Based on Shape Memory Alloy Micro-Actuators; IEEE Int'l Conference; Jul. 2005; pp. 121-126.

Velazquez, Ramiro et al.; Miniature Shape Memory Alloy Actuator for Tactile Binary Information Display; Proceedings of the 2005 IEEE; Apr. 2005; pp. 1344-1349.

Yoshikawa, Tsuneo et al.; A Touch and Force Display System for Haptic Interface; Proceedings of the 1997 IEEE; Apr. 1997; pp. 3018-3024.

Y. Bar-Cohen et al.; Scaling Laws of Microactuators and Potential Applications of EAP in MEMS; SPIE 6th Annual Int'l Symposium; Mar. 1999; p. 1.

Velazquez, Ramiro et al.; A Compact Tactile Display for the Blind with Shape Memory Alloys; pp. 1-6.

Grant, Danny et al.; Constrained Force Control of Shape Memory Alloy Actuators; Proceedings of the 2000 IEEE; Apr. 2000; pp. 1314-1320.

Dai, Steve; Actuator2004; internal trip report; posted on Compass; Jun. 2004; pp. 1-4.

HTML Basics: Page Format Guidelines; from www.jegsworks.com; Jan. 2008; pp. 1-6.

Miller, Nate; OpenGL Texture Mapping: An Introduction; from www.gamedev.net; Feb. 29, 2000; pp. 1-5.

International Search Report from EP Patent Office; PCT Application No. PCT/US2008/058546; dated Jul. 3, 2008; pp. 1-13.

Chinese Office Action; Chinese Application No. 200880117085.4; Dated Oct. 26, 2011.

International Search Report and Written Opinion; International Application No. PCT/US08/68961; Jan. 29, 2009.

International Search Report and Written Opinion; International Application No. PCT/US08/73790; Mar. 20, 2009.

United States Patent and Trademark Office, "Non-Final Rejection" for U.S. Appl. No. 11/777,562 dated Mar. 21, 2011, 17 pages.

United States Patent and Trademark Office, "Non-Final Rejection" for U.S. Appl. No. 12/194,372 dated Apr. 13, 2012, 9 pages.

* cited by examiner

METHOD AND APPARATUS FOR CONTROLLING A KEYPAD OF A DEVICE

CROSS-REFERENCE TO RELATED APPLICATIONS

The present patent application claims priority from and the benefit of U.S. Provisional Patent Application No. 60/989,288, filed Nov. 20, 2007, and entitled Method and Apparatus for Controlling a Keypad of a Device, which prior application is hereby incorporated herein by reference. This application is also related to co-pending applications entitled Method and Apparatus for Controlling a Skin Texture Surface on a Device, filed on Apr. 4, 2007, having application Ser. No. 11/696,466, inventor Michael E. Caine, owned by instant Assignee and is incorporated herein in its entirety by reference; Method and Apparatus for Controlling a Skin Texture Surface on a Device Using a Shape Memory Alloy, filed on Apr. 4, 2007, having application Ser. No. 11/696,481, inventor Michael E. Caine, owned by instant Assignee and is incorporated herein in its entirety by reference; Method and Apparatus for Controlling a Skin Texture Surface on a Device Using Hydraulic Control, filed on Apr. 4, 2007, having application Ser. No. 11/696,496, inventor Michael E. Caine, owned by instant Assignee and is incorporated herein in its entirety by reference; and Method and Apparatus for Controlling a Skin Texture Surface on a Device Using a Gas, filed on Apr. 4, 2007, having application Ser. No. 11/696,503, inventor Michael E. Caine, owned by instant Assignee and is incorporated herein in its entirety by reference.

FIELD OF THE INVENTION

The disclosure relates generally to portable electronic devices and more particularly to portable electronic devices that employ variable skin texture surfaces.

BACKGROUND OF THE INVENTION

Portable electronic devices, such as laptops, wireless handheld devices such as cell phones, digital music players, palm computing devices, or any other suitable devices are increasingly becoming widespread. Keypads used for text entry in portable electronic devices can be difficult to use given the small size of the keys relative to a user's finger. Improved usability of such devices can increase sales for sellers as consumer demand can be driven by differing device usability characteristics and device features.

Providing differing device usability such as by changing the tactile configuration and/or visual appearance of a surface of a portable electronic device by altering the emission reflection of light to change the overall color or graphics that appear and disappear are known. Surfaces of electronic devices, including portable electronic devices may include, for example, exterior surfaces of the device, activation keys such as keys in a keypad or navigation keys, tactile navigation interfaces, or any other suitable surface.

Also, as one example to enhance the tactile configuration and/or visual appearance of a device, it has been proposed to employ haptics such as in the form of electro-active polymers that change 3D shape, also referred to as texture, based on the application of a voltage to portions of the electro-active polymer. Differing textures and shapes can thereby be produced to give the device a different visual appearance and/or tactile configuration. For example, if a portable device includes such electro-active polymers as a type of outer skin, turning power on to the device can cause the electro-active polymer to be activated so that a 3D texture is present and can be felt by a user of the device. It has also been proposed to use piezoelectric actuators as a type of haptic sensor on handheld devices. In one example, a control slider is configured as a bending piezo-actuator. Also it has been proposed to provide handheld devices with menus, such as piezo-actuated haptic icons, that have different tactile feedback for a user so that the user can, for example, turn a phone to a "silent" mode from an active mode by feeling the proper control key and receiving feedback of actuation of the key once it is activated. It is desirable to provide differing methods and apparatus for actuating skin texture surfaces of a device and differing user experiences.

BRIEF DESCRIPTION OF THE DRAWINGS

The present invention and the corresponding advantages and features provided thereby will be best understood and appreciated upon review of the following detailed description of the invention, taken in conjunction with the following drawings, where like numerals represent like elements, in which:

FIGS. 9-10*a* are cross-sectional views illustrating the operation of the structure shown in FIG. 8;

DETAILED DESCRIPTION OF THE EMBODIMENTS

In one example, a device includes a controllable skin texture defining a keypad, a sensor, and control logic. The sensor senses a proximity of a pointing element to a particular key of the keypad based on a user input. The control logic adjusts a height of the particular key with respect to another key of the keypad in response to the sensor sensing the proximity of the pointing element to the particular key. In one example, the device includes a display for displaying a plurality of keys. The control logic adjusts visual characteristics of the particular key and an adjacent key with respect to each other and with respect to other keys of the plurality of keys in response to the sensor sensing the proximity of the pointing element to the particular key. A related method is also disclosed.

Among other advantages, the device moves the particular key closer to a user, which aids the user in selecting the particular key of a keypad. In addition, adjacent keys are moved closer in proximity to the user, but not as close as the particular key, which aids the user in navigating to adjacent keys more efficiently. Furthermore, if desired visual characteristics of the desired and adjacent keys are adjusted with respect to each other and with respect to other keys to aid the user in selecting the particular key and navigating the keypad more efficiently. Other advantages will be recognized by those of ordinary skill in the art.

In one example, the control logic adjusts a height of the adjacent key with respect to other keys of the keypad in response to the sensor sensing the proximity of the pointing element to the particular key. In one example, the visual characteristics are adjusted by at least one of brightness, size, color, shape, and font.

In one example, the sensor senses whether the particular key has been selected based on the user input. In one example, the control logic adjusts the height of the first key and/or the second key when the first key has been selected. In one example, the keypad provides user feedback that is auditory and/or tactile when the at least one key has been selected.

Figure 1:
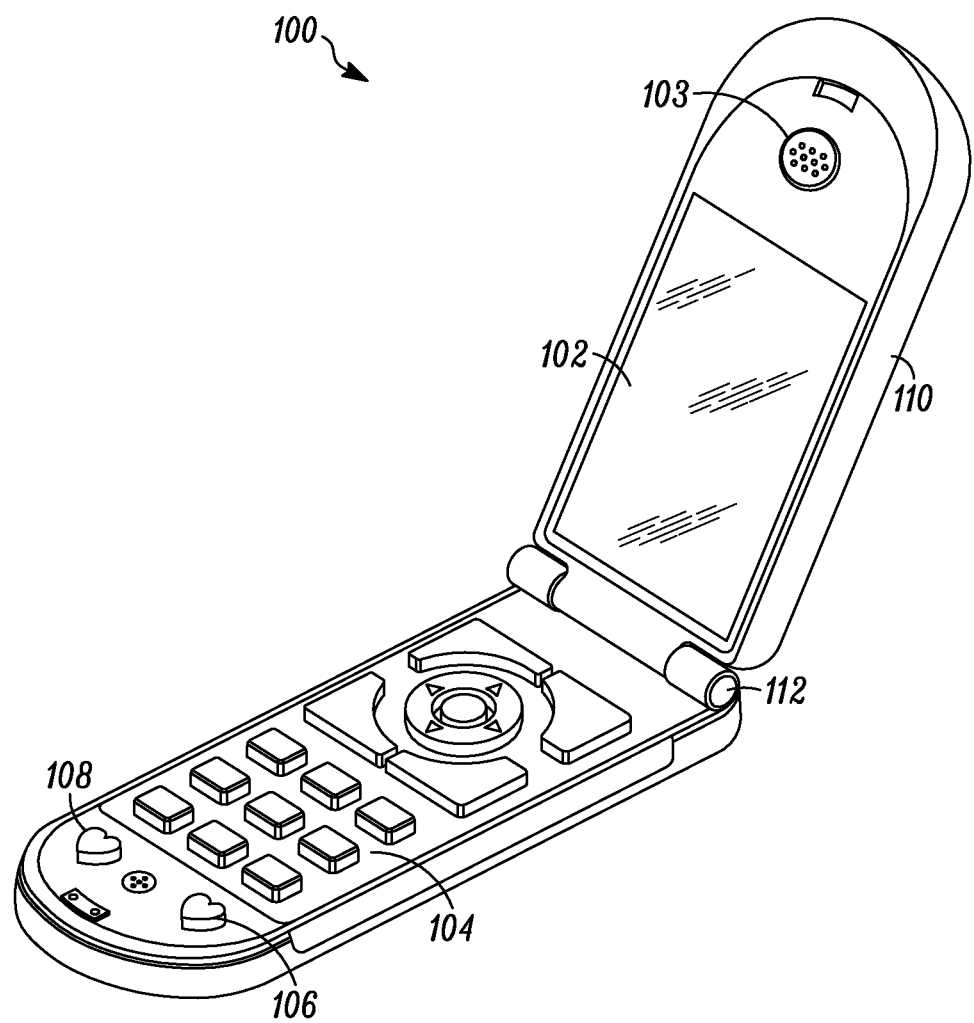
FIG. 1 is a perspective view of an example of a wireless handheld device that employs a controllable skin texture surface in accordance with one embodiment of the invention.

FIG. 1 illustrates one example of a portable electronic device 100, shown in this example to be a handheld wireless device, that includes a wireless telephone subsystem for communication via one or more suitable wireless networks, and other conventional circuitry along with a display 102 for displaying information to a user that is coupled to the wireless telephone subsystem as known in the art. The portable electronic device 100 also includes a controllable skin texture surface 104 that in this example, covers a portion of a housing (e.g., base housing) of the device 100 that forms part of a user interface portion, namely a user keypad. The controllable skin texture surface 104 also includes other controllable surfaces 106 and 108 that are for aesthetic purposes and are controlled to change the tactile configuration of a non-user interface portion of the portable electronic device, such as another area of the outer portion of the device. As shown in this particular example, the portable electronic device 100 is a flip phone having a foldable housing portion 110 that pivots about a pivot mechanism 112 as known in the art. The foldable housing portion 110 may also include a keypad and controllable skin texture surface as desired. The controllable skin texture surface 104 is controlled to change the tactile configuration of a portion of the skin texture surface to, in this example, raise respective portions of the skin texture to provide a tactilely detectable keypad and other tactile and/or aesthetic features. In one example, the controllable skin texture surface 104 may be flat when, for example, the phone is in a standby mode, but the controllable skin texture surface 104 is controlled to activate portions thereof to provide raised keys for a keypad when an incoming wireless call is detected and is controlled to become flat (deactivated) when a call ends. Other input information is also used to control the actuation/deactuation of the controllable skin texture as described below.

Figure 2:
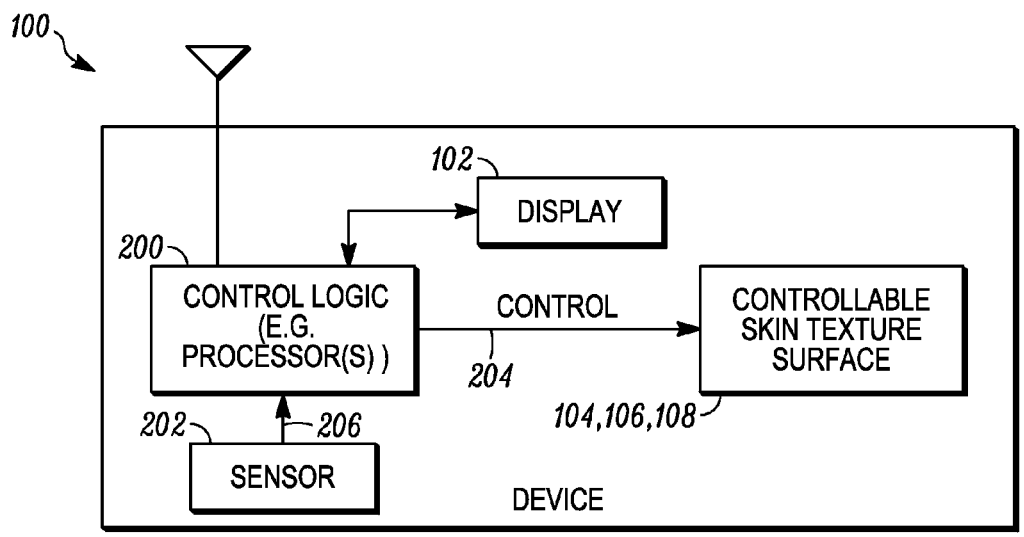
FIG. 2 is a block diagram illustrating one example of an apparatus that includes control logic that controls a controllable skin texture surface in accordance with one embodiment of the invention.

FIG. 2 illustrates in block diagram form the portable electronic device of FIG. 1 or any other suitable portable electronic device such as a laptop computer, portable Internet appliance, portable digital media player, or any other suitable portable electronic device. As shown, control logic 200 changes a tactile configuration of a portion of the controllable skin texture surface 104 (and/or 106 and 108) by producing control information 204 (e.g., digital or analog signals) in response to at least any one of a received wireless signal, a battery level change condition such as a low battery condition, based on an incoming call or message, based on information from a proximity sensor, sound sensor, light sensor or other environmental sensor generally designated as 202, or data representing a user of the device, such as the input via a microphone and a voice recognition module that recognizes the user's voice, or a password or passcode entered by a user indicating a particular user, or data representing completion of a user authentication sequence such as the entry of a password and PIN or any other suitable authentication process as desired. Other data may also be used such as control data based on a pressure sensor, humidity sensor, shock sensor or vibration sensor. State changes may also be used to control the texture such as, but not limited to, radio signal strength, device orientation, device configuration (e.g., flip open, phone mode vs. audio playback mode vs. camera mode), a grip of a user or data representing a change of state of a program executing on a device, including the state of a program executing on another device connected via a wired or wireless connection such as a server or another portable device. Other incoming data representing other incoming signals may include, for example, changing or controlling the texture based on an incoming SMS, email or instant message, a proximity to a radio source such as an RFID reader, a Bluetooth™ enabled device, a WIFI access point, or response from an outgoing signal such as a tag associated with an RFID. Other data that may be suitable for triggering or controlling the activation of the texture may include data representing the completion of a financial transaction, completion of a user initiated action such as sending a message, downloading a file or answering or ending a call, based on a timeout period, based on the location of the device relative to some other device or an absolute location such as a GPS location, status of another user such as the online presence of another instant message user, availability of a data source such as a broadcast TV program or information in a program guide, based on game conditions such as a game that is being played on the device or another networked device, based on for example, other modes of data being output by the device such as the beat of music, patterns on a screen, actions in a game, lighting of a keypad, haptic output, or other suitable data. By way of example, the control logic 200 may raise portions of the controllable skin texture surface 104 to represent keys, in response to sensor output information 206 such as the sensor 202 detecting the presence of a user, based on a sound level detected in the room, or output based on the amount of light in a room.

For example, if the light level in a room decreases to a desired level as sensed by a light sensor, the sensor 202 outputs the sensor output information 206 and the control logic 200 may activate the controllable skin texture surface 104 to provide a raised keypad feature so that the user can feel the keypad surface in a dark room since there is not much light to see the keypad. In addition if desired, light source(s) such as LEDs located underneath the controllable skin texture surface may also be illuminated under control of the control logic in response to the light sensor detecting a low light level in the vicinity of the device. A sound sensor may also be used, for example, to control which portions of the controllable skin texture surface are used depending upon, for example, the amount of noise in a room. In addition, the control logic 200 may control the controllable skin texture surface 104, 106 or 108 to provide a pulsating action, or any other suitable tactile configuration as desired based on the sensor output information. For example, the device of FIG. 1 may have controllable skin texture surface 104 configured about the exterior of the device so that when the skin texture surface is activated (e.g., raised) in certain portions, the device appears to be pulsating, like a heartbeat, or may provide a sequential raising and lowering of certain portions of the skin texture to provide a user desired movement, such as an animated pattern.

The control logic 200 may be implemented in any suitable manner including a processor executing software module that is stored in a storage medium such as RAM, ROM or any other suitable storage medium which stores executable instructions that when executed, cause one or more processors to operate as described herein. Alternatively, the control logic as described herein, may be implemented as discrete logic including, but not limited to, state machines, application specific integrated circuits, or any suitable combination of hardware, software or firmware.

In one example, the controllable skin texture surface 104, 106, and 108 may include a mechanical actuation structure that is coupled to a flexible skin structure that moves in response to moving of the mechanical actuation structure, a hydraulic actuation structure that is coupled to a flexible skin structure that moves in response to movement of fluid in the hydraulic actuation structure, and expandable gas actuation structure that is coupled to a flexible skin structure that moves in response to movement of gas in the expandable gas actuation structure and a shape memory alloy actuation structure that is coupled to a flexible skin structure that moves in response to movement of a metal alloy in the shape memory alloy actuation structure, or any suitable combination thereof.

Figure 3:
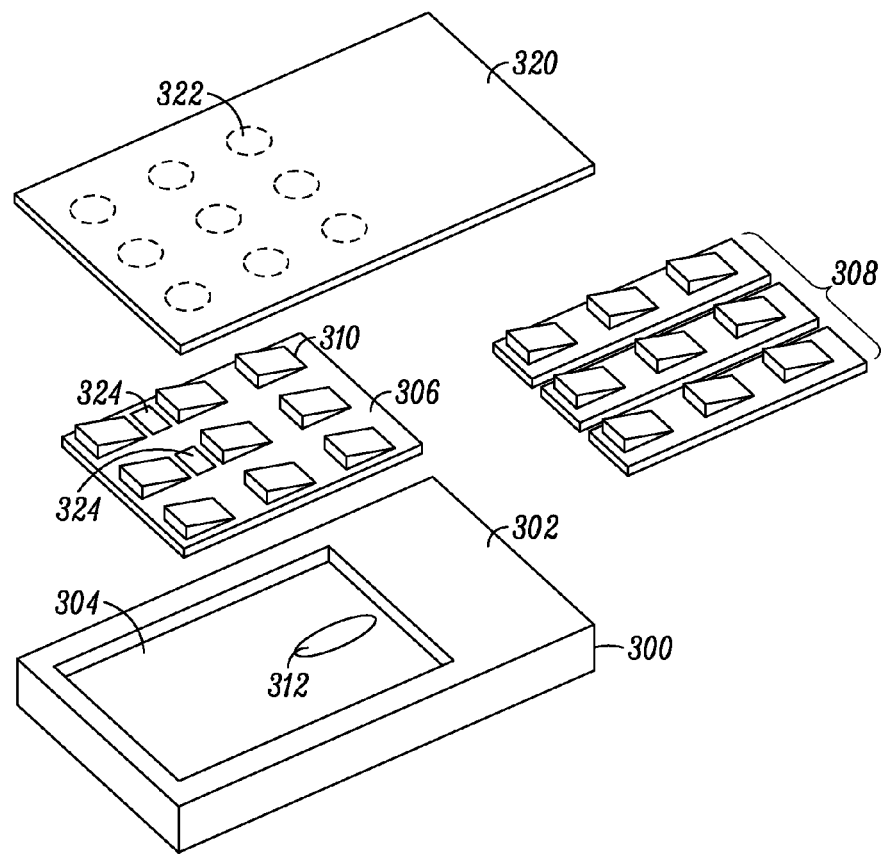
FIG. 3 is an assembly view of a portion of an apparatus in accordance with one embodiment of the invention.

FIGS. 3-7 illustrate various examples of a mechanical actuation structure that is used to move a flexible skin structure in response to the moving of the mechanical actuation structure. Referring to FIG. 3, a portable electronic device 300, is shown, which may be any suitable portable electronic device as desired. The particulars of the device depend on the desired application. In this example, the portable electronic device 300 includes a housing 302 with a recessed area 304 that receives one or more movable ramp structures 306 or 308. Ramp structure 306 as shown here includes a single plate that has a plurality of ramp portions 310 that are raised with respect to the plate. The plate slidably moves in the recessed area 304 and is allowed to slide back and forth in the recessed area. As recognized, any suitable configuration may be used to provide the sliding operation. The plate is moved by an actuator 312 such as a cam or motor or any combination thereof or any other suitable structure. The controllable skin texture surface includes a flexible skin structure 320 that, in this example, includes molded texture elements that may be any suitable shape and size, shown in this example as texture pockets generally shown as 322 in the configuration of a keypad. The texture pockets 322 are molded as pockets in an under portion of the flexible skin structure 320 and are raised up by corresponding ramps 310 on the ramp structure 306 when the ramp structure is moved. Hence, the texture pockets 322 are raised under control of the actuator 312. The flexible skin structure covers the ramps and may be affixed to the housing or other structure as desired. It will be recognized that one ramp may be used to move multiple texture elements and that the ramps may also be any suitable configuration (including shape or size).

The flexible skin structure 320 may be made out of any suitable flexible material including, but not limited to polyurethane, rubber, or silicone. It may be suitably attached to an outer portion of the housing of the device 300 via an adhesive or any other suitable mechanism. The flexible skin structure 320 as shown has a portion that covers the movable ramp structure 306. When the movable ramp structure 306 pushes up the molded pockets 322, it changes the tactile configuration of the controllable skin texture surface so a user will feel the locations below the ramps on the flexible skin structure 320. As shown, there may be touch sensors 324, shown as capacitive sensors positioned on the ramp structure 306 at locations between the ramps if desired, or on top of the ramps if desired which when touched by a user, generate a signal that is interpreted by the control logic of the device 300 to be an activation of a key, in this particular example. It will be recognized that touch sensors 324 may be any suitable sensor and may be located at any suitable location within the device as desired. The texture pockets 322 may be, for example, thinned out sections that are molded into a rear surface of the flexible skin structure 320. However, any suitable configuration may be used. In this example, the flexible skin structure 320 includes a layer of flexible material that have a plurality of defined changeable skin texture elements 322, each having a portion configured to engage with the movable ramp structure 306. The capacitive sensor serves as a type touch sensor 324.

Figure 4:
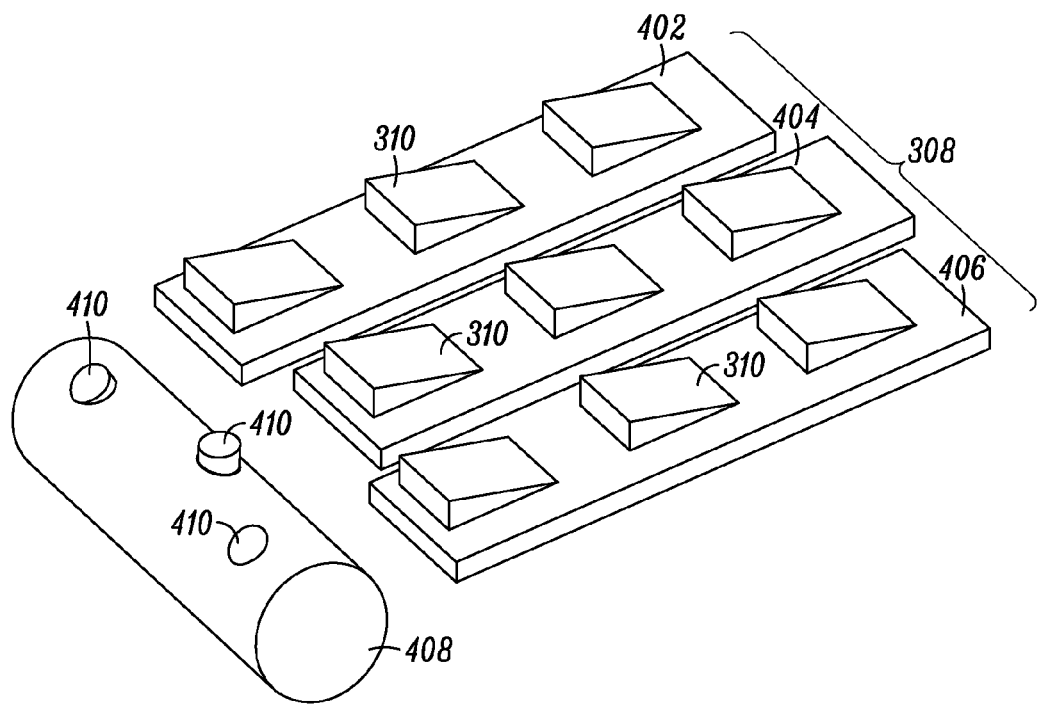
FIG. 4 is a perspective view illustrating one example of a portion of a mechanical actuation structure that may be part of a controllable skin texture surface in accordance with one embodiment of the invention.

FIG. 4 illustrates an alternative embodiment to the single plate shown in FIG. 3. In this example, a multiple segment movable ramp structure 308 includes a plurality of ramps 402, 404, 406 and a cam structure 408 that mechanically engages with, for example, edges of the plurality of ramps to move at least one of the plurality of ramps in response to, in one example, mechanical movement of a portion of the device. For example, if the device has a clam type housing design, movement of the clam housing causes rotation of the rotating cam 408 through a suitable mechanical linkage. Alternatively, a motor may be controlled to actuate the movement of the plurality of ramps 402, 404, 406 directly or indirectly through rotating the cam 408. For example, a motor may be coupled to rotate the cam 408 based on an electrical control signal from control logic.

As shown, the ramp structure 308 includes a plurality of individual sliding ramp elements 402, 404 and 406 each including a plurality of ramps 310. As also shown, the cam structure 408 which is shown to move in a rotational manner, may also be structured to move in a non-rotational manner, such as a sliding manner if desired, or any other suitable manner. The cam structure includes ramp control elements 410 that, in this example, protrude from the cam structure to engage an edge of each of the respective individual sliding ramp elements 402, 404 and 406. The ramp control elements 410 are positioned to cause movement of the plurality of sliding ramp elements in response to movement of the cam structure 408. Actuation of the plurality of sliding ramp elements 402-406 may be done in response to the information set forth above such as based on a received wireless signal, battery level change condition, such as a recharge condition (actuate skin), low battery level (deactuate skin), an incoming call, or based on any other suitable condition. As such, a series of individual sliding panels are located beneath a flexible skin structure 320 and are actuated in this example by a cam structure. The pattern of ramp control elements 410 determine in what sequence the sliding panels are actuated. As noted, the cam structure can be driven by a motor or integrated into the device such that a hinge of a clam shell type device that may be found, for example, on a mobile handset may actuate the cam directly so that opening of the clam shell causes the raising of the portions of the flexible skin texture to represent a keypad. It will also be recognized that the mechanical actuation structure described may move any portion of the flexible skin structure 320 to provide, for example, raised portions that are not associated with a user interface and may be moved to provide any desired tactile configuration.

Figure 5:
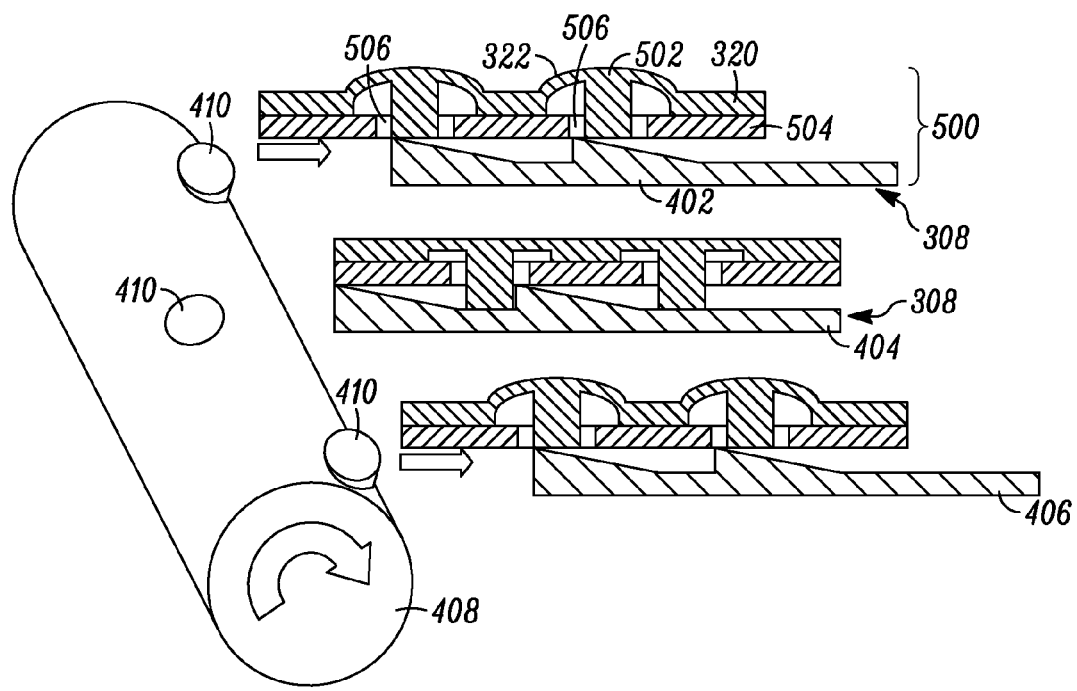
FIG. 5 is a perspective and side view of the structure shown in FIG. 4 and a portion of a flexible skin structure in accordance with one embodiment of the invention.

FIG. 5 shows a cross sectional view of a controllable skin texture surface 500 similar to that shown in FIG. 4 but in this example, the flexible skin structure 320 may also include tabs 502 that are integrally formed with the texture pockets 322 to assist in raising the center of the texture pockets 322, if desired. As also shown, the flexible skin structure 320 is also considered to include a plate structure 504 that includes openings 506 corresponding to each desired texture element. The openings 506 receive the tabs 502 configured to engage with the movable ramp structure 308. As shown, as the movable ramp structure 308 is moved, it raises or lowers portions of the flexible skin structure 320 in response to movement of the cam structure 408. In this example, the individual sliding elements 402 and 406 have been moved to raise portions of the flexible skin structure 320 whereas individual sliding element 404 has not been moved and therefore the flexible skin structure is flat at the appropriate locations. As previously noted above, if the device includes a movable housing portion such as a clam shell configuration or any other suitable configuration, the movable housing portion may be mechanically coupled to the cam structure 408 such that mechanical movement of the housing portion causes movement of the cam structure. Alternatively, the cam structure may be electronically controlled independent of any movable housing portion as desired. For example, a motor may be coupled to engage with the cam structure and move the cam structure in response to an electronic control signal to move one or more of the plurality of ramps to a desired location.

As described, the sliding movable ramp structure 308, 404-406 with wedge shaped features (e.g., ramps) moves horizontally to force tabs (e.g., pins) molded into the back of the flexible skin structure upwardly and thereby causes portions of the flexible skin structure corresponding to the texture pockets to be raised and thereby create a desired texture pattern. As noted above, a touch sensor, such as a capacitive sensor, may also be used to detect the touch of a user's finger against the flexible skin structure. The sensing may be used as an input to actuate the texture mechanism or to execute another function that would correspond to the press of a button. In addition, mechanical switches such as dome-type switches known in the art could be placed underneath portions of the movable ramp structure to allow a user to press and thereby actuate one or more of the switches.

Figure 6:
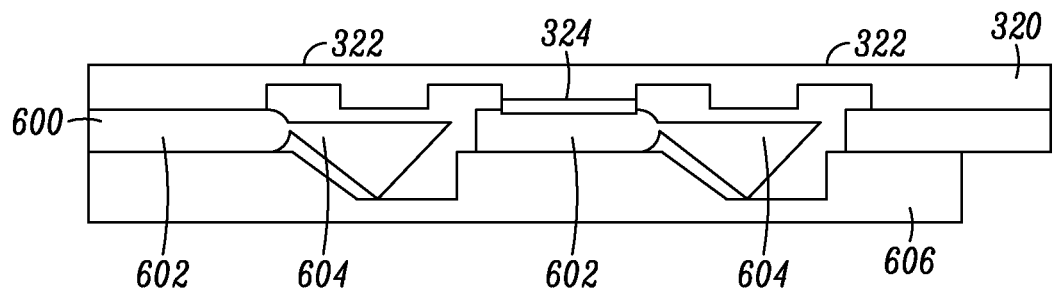
FIG. 6 is a cross-sectional view illustrating another example of a controllable skin texture surface that employs a mechanical actuation structure in accordance with one embodiment of the invention.
Figure 7:
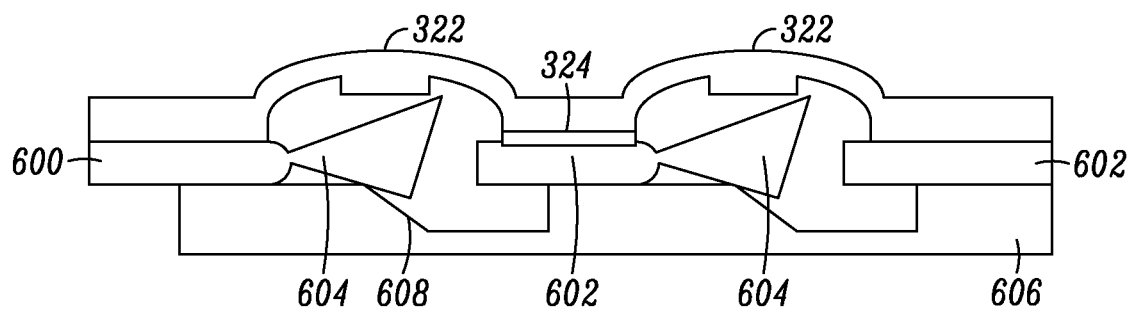
FIG. 7 is a cross-section view as shown in FIG. 6 with texture actuation in accordance with one disclosed example.

FIGS. 6-7 illustrate another example of a mechanical actuation structure that uses a movable ramp structure and flexible skin structure. In this example, the tabs 502 (FIG. 5) need not be utilized. Instead, a wedge shaped element 600 includes an anchored portion 602 and a movable wedge section 604 that pivots with respect to the anchored portion 602. Each wedge shaped element 600 that includes the anchored portion 602 and movable wedge section 604 may be secured in the device in a fixed location below the flexible skin structure 320 and above a sliding ramp or movable ramp structure 606. As the movable ramp structure 606 is moved horizontally, the pivotable wedge shaped elements 604 are moved by ramp sections 608 of the movable ramp structure 606 such that they come in contact with desired portions of the flexible skin structure 320. Among other advantages, this structure may provide reduced friction and wear between sliding elements and tabs molded into the flexible skin structure. Other advantages may be recognized by those of ordinary skill in the art. However, any desired flexible skin structure and ramp structure may be employed. Movement of the ramp structure causes movement of the wedge shaped elements and movement of the flexible skin structure to provide a change in tactile configuration. As also shown, the substrate anchored portion 602 serves as a substrate for the flexible skin structure 320 and is interposed between the flexible skin structure 320 and the movable ramp structure 606. A touch sensor 324 is supported by the substrate and located between at least two movable portions (e.g., 322) of the flexible skin structure. It will be recognized that the touch sensors 324 may be suitably located at any location depending upon the desired functionality of the portable electronic device.

Figure 8:
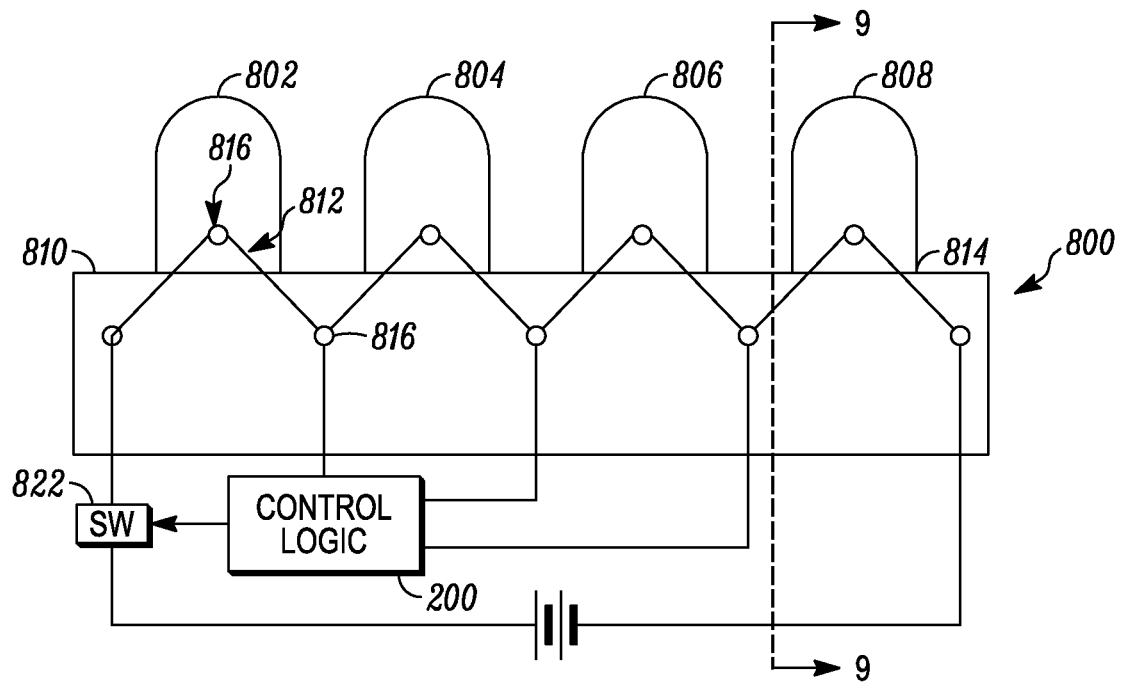
FIG. 8 is a top view of one example of a shape memory alloy actuation structure that may be employed as part of a controllable skin texture surface according to one example of the invention.
Figure 9:
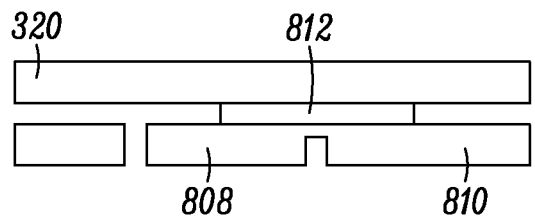
Figure 10A:
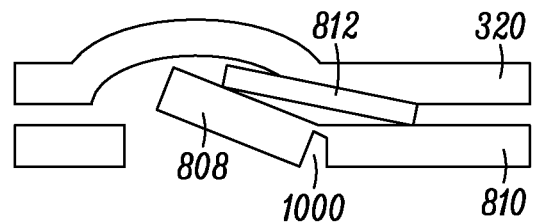

FIGS. 8-10 illustrate an example of a shape memory alloy actuation structure 800 and a corresponding flexible skin structure 320 that moves in response to movement of a metal alloy 812 in the shape memory alloy actuation structure 800 in accordance with one embodiment. FIG. 8 is a top view illustrating a plurality of pivoting elements 802-808 that are pivotally connected with a base 810. The plurality of pivoting elements 802-808 pivot along pivot points generally indicated at 814 caused by, in this example, the lengthening and shortening of a shape memory alloy 812 such as nitinol wire, or any other suitable shape memory alloy. In one example, a single segment of shape memory alloy 812 may be connected to the pivoting elements 802-808 and to the base portion as diagrammatically illustrated as connection points 816. It will be recognized, however, that any suitable connection location or connection technique may be used to affix one or more shape memory alloy segments to one or more pivoting elements. It will also be recognized that the shape of the pivoting elements and their length and material may vary depending upon the particular application. One example for illustration purposes only, and not limitation, may include using polypropylene or nylon. Also the hinged area or pivot location 814 may be thinned if desired.

As shown, a voltage or current source 820 is selectively applied by opening and closing switch 822 by suitable control logic 200. In addition to, or alternatively, a separate segment of shape memory alloy may be used independently for each pivot element 802-808 so that each pivot element may be controlled independently by the control logic. However, for purposes of explanation, the discussion will assume that a single shape memory alloy element is used to move all the pivoting elements 802-808 at the same time. In any embodiment, when current is passed through the shape memory alloy, it shortens, causing the pivotal elements 802-808 to push up against the flexible skin. As such, the base 810 may be suitably mounted horizontally, for example, underneath the flexible skin structure and positioned so that the pivoting elements 802-808 suitably align with desired portions of the flexible skin structure to move (e.g., raise and lower) portions of the flexible skin structure. As noted, different or separate wires may be attached to different pivoting elements in order to provide selectively as to which texture elements are actuated. In addition, different amounts of electric current may be applied to the separate wires in order to individually control how much each pivotal element pushes up against the flexible skin. In this example, the controllable skin texture surface includes a skin texture actuation structure that includes a plurality of pivoting elements 802-808 having a shape memory alloy (whether single or multiple elements thereof) coupled to the skin texture to effect movement of the pivoting elements against the flexible skin structure which moves in response to movement of the plurality of pivoting elements. The movement of the pivoting elements change a tactile configuration of a portion of the controllable skin texture surface that is contacted by the pivoting elements. The control logic 200 activates, for example, switch 822 or a plurality of other switches to provide suitable current to control movement of the pivoting elements by applying current to the shape memory alloy element 812. If desired, a voltage source or current source may be provided for each individual pivoting element and may be selectively switched in/out to control the movement of each pivoting element as desired. Any other suitable configuration may be also be employed. Also, the flexible skin over the hinged elements will generally act to provide a restorative force that returns the elements to a planar state when the current through the SMA is turned off.

FIGS. 9-10 show a cross section of one pivoting element of FIG. 8 and further includes the illustration of the flexible skin structure 320 and further shows a pivoting element 808 in both an activated state (FIG. 10) where the flexible skin structure is raised, and an inactive state where the flexible skin structure 320 is flat (FIG. 9). As such in this example, the flexible skin structure 320 has pockets corresponding to desired texture features that are molded into the reverse surface or under surface thereof and bonded to a portion of the housing or other substructure within the device as noted above. A series of pivoting elements 802-808 underneath the flexible skin structure are connected, in one example, via a single length of shape memory alloy such that in a neutral position, the pivoting elements lie flat. When an electric current is run through the shape memory alloy, its length shortens by, for example, approximately 5% or any other length depending upon the type of shape memory alloy and amount of electric current applied, and causes the pivoting elements to rise up and push against the flexible skin structure causing the appearance of a bump. When the electrical current is no longer applied, the flexible skin structure and underlying pivoting element returns to the neutral position due to tension in the flexible skin.

Figure 10B:
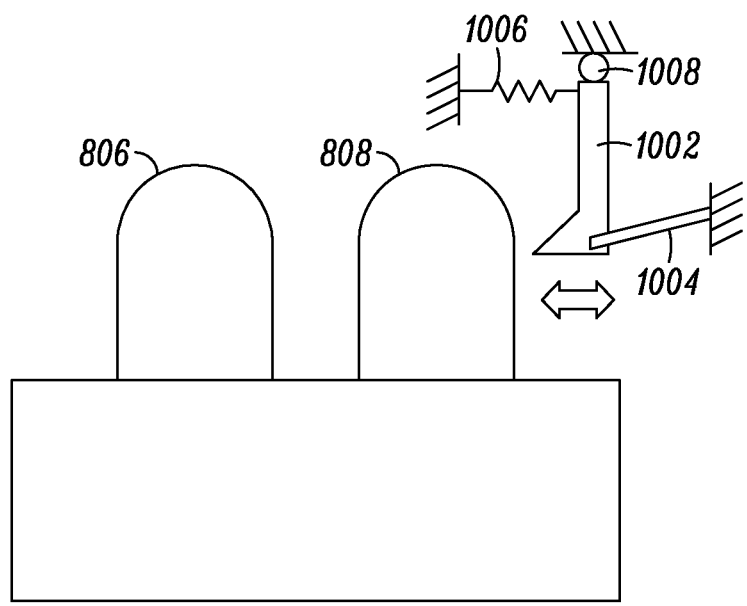
FIG. 10*b* is a diagram illustrating one example of a bi-stable shape memory alloy actuation scheme according to one example of the invention.

In another embodiment shown in FIG. 10b, a second series of pivoting elements 1002, as part of a hinge lock structure, may be introduced beneath the first series of pivotal elements 806, 808 to act as locks. When the first series of hinged elements 806, 808 are actuated, the second series of pivoting elements 1002 are positioned so as to fall in to gaps 1000 created by the motion of the first set of pivoting elements thereby locking them into the raised position or to simply position underneath the first pivotal elements. It will be recognized that any other location may also be used or that any other suitable technique may be employed. When the electric current applied to the corresponding shape memory alloy element 812 that moves the first set of hinged elements 808 is stopped, the locking action of the second set of elements 1002 holds the first pivoting elements 806, 808 in place by a biasing element 1006 pulling the elements 1002 under the elements 808. By applying an electric current to a shape memory alloy element 1004 connected to the second set of pivoting elements 1002, the first set of pivoting elements 806, 808 will be unlocked and thereby allows the first series of pivoting elements to return to a neutral position due to tension in the flexible skin. This provides a type of bi-stable shape memory alloy actuation scheme. As shown, an end of a biasing element 1006 such as a spring is fixedly attached to a portion of the housing or any other suitable structure and another end is caused to contact a portion of the pivotal second set of elements 1002. The pivotal second set of elements may be made of any suitable structure such as plastic that suitably bends about a pivot point shown as 1008. As shown, a portion of the pivoting elements 1002 are also fixedly attached to a structure of the device to prevent movement of an end thereof. Similarly, the shape memory alloy element 1004 associated with each locking element 1002 also has a portion connected to the element 1002 as well as a fixed structure. The locking element swings as shown, in this example in plane of the FIG. 10b, for example, to block the hinged element 808 from lowering down into the plane of the page as shown. As such, the locking feature moves in the plane of the surface to lock the hinged elements. This as opposed to, for example, moving out of the plane in an opposite direction of the hinged element, which may also be done if desired. The thickness of the overall implementation, however, may be less if the locking element is caused to move in plane to the figure as shown. In this example, the hinged elements 808 rise out of the plane when actuated by an SMA element or actuator (not shown) and is blocked by the locking element moving in plane of the figure as shown. It will be recognized that although a single locking element 1002 is shown, that a suitable array of locking elements may be positioned for any respective pivoting hinged element 808. In addition, it will be recognized that in this example, a configuration as shown that provides a passive lock and an active unlock condition. However, it will be recognized that by reversing the bias element and the shape memory alloy element 1006 and 1004 respectively, that an active lock and a passive unlock structure may be employed. Hence, one or more pivoting elements serves as a type of pivot lock structure made of a shape memory alloy, the same type for example, as noted above. The pivot lock structure is coupled to the control logic 200 and is controlled to be positioned to lock the pivoting elements in a desired position. The pivot lock structure may be alternately positioned to passively lock the pivoting elements in a desired position, and then controlled to release them when desired. As such the control logic controls the second shape memory alloy to deactuate the hinge lock structure to unlock the plurality of hinged elements in response to a passive actuation of the hinge lock structure.

A method for actuating a controllable skin texture surface includes, for example, controlling the first shape memory alloy to actuate the plurality of pivoting elements. In response to the actuation, the pivot lock structure will naturally act to lock the plurality of pivoting elements in a first position. The method includes deactivating the first shape memory alloy in response to the pivot lock structure being actuated. This allows the current to the first pivoting element to be removed and it is locked in place. The method may also include then unlocking the hinged elements by, for example, by actuating the first shape memory alloy and then controlling the second shape memory alloy to unlock the hinge lock structure by applying current to the shape memory alloy actuator that moves the lock structure to unlock the pivoting elements from their raised position.

Figure 11:
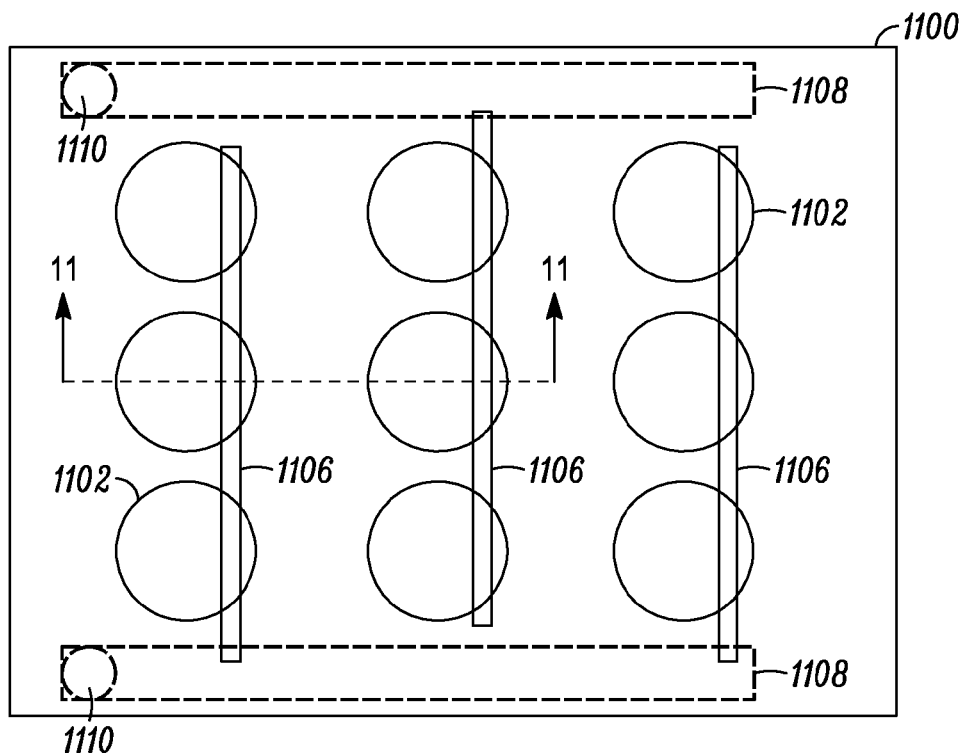
FIG. 11 is a top view illustrating a portion of a portable electronic device that employs an embodiment of a controllable skin texture surface.
Figure 12:
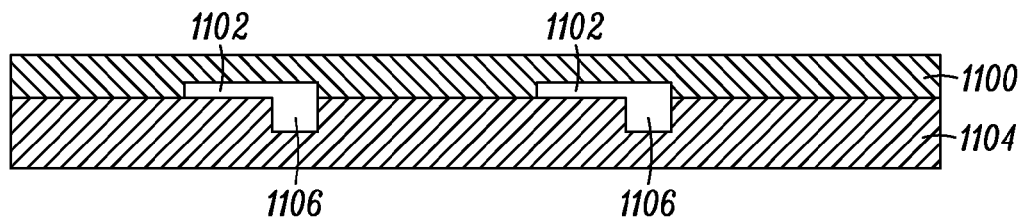
FIGS. 12-13 are cross sectional views of portions of FIG. 11 illustrating a deactuated and actuated skin texture structure in accordance with one embodiment.
Figure 13:
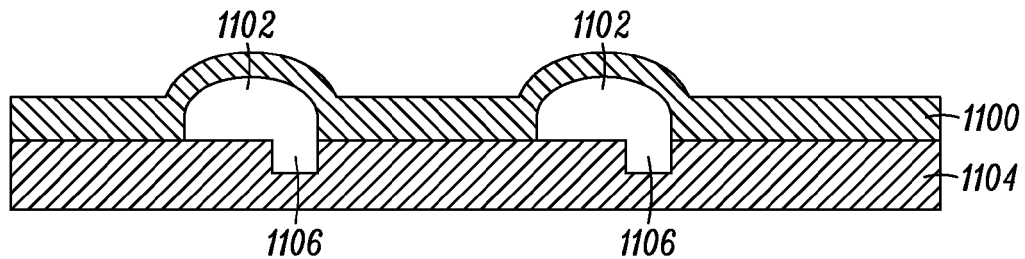

FIG. 11 illustrates a portion of a portable electronic device that employs an embodiment of a controllable skin texture surface, and in this example, the portion of the electronic device is shown to be a keypad. In this example, the controllable skin texture surface includes a skin texture surface actuation structure that includes a hydraulic actuation structure that causes a change in tactile configuration of a flexible skin structure in response to movement of fluid underneath the flexible skin structure. FIGS. 12-13 are cross sectional views of a portion of FIG. 11 and will be described together with FIG. 11. A flexible skin structure 1100 similar to that described above with respect, for example, to FIG. 3 and elsewhere, includes fluid chambers or pockets 1102 corresponding to desired texture features that are molded into a reverse surface of the flexible skin structure. As also shown above, the wall thickness of the pockets may be thinner than other portions of the flexible skin texture to allow less resistance to fluid expansion. The flexible skin structure 1100 is bonded, for example, to a surface of the housing of the portable electronic device to form suitable seals around the various fluid chambers 1102. A supporting substrate 1104 which may be the housing of the device or a separate substrate within the device, includes fluid channels 1106 formed therein that are positioned to be in fluid communication with the fluid chambers 1102. It will be recognized that any suitable structure of first channels 1106 may be used including separate channels that allow the activation of any suitable texture location, depending upon the desired application.

As shown in FIGS. 12-13 for example, when fluid is removed from the channels 1106, the flexible skin structure 1100 is flat or in an unactuated state, and when an appropriate amount of fluid is moved into the various chambers, the flexible skin structure is actuated at appropriate locations to provide a three dimensional pattern on an outer surface of the portable electronic device. As shown, the channels 1106 are fluidly connected with one or more manifolds 1108 that may be molded into a surface of the housing or substrate 1104 or be a separate structure if desired. Separate positive displacement pumps (not shown) may be fluidly coupled to each inlet 1110 to provide different fluid pressure for each manifold 1108 or one pump may be fluidly coupled to each inlet 1110 to provide a single fluid pressure The manifolds 1108 as described are in fluid communication with one or more fluid reservoirs via one or more pumps. Control logic 200 sends the appropriate control information to cause the positive displacement pumps to transfer fluid from an internal reservoir (not shown) in the device through the manifold and into the channels and hence the chambers molded into the rear surface of the flexible skin structure 1100. In some embodiments, the fluid pressure can be different for each manifold 1108 in order to raise the respective fluid chambers 1102 to different relative heights. The hydraulic actuation structure includes in this example, the substrate 1104 that includes one or more fluid channels 1106 and the flexible skin structure 1100 is suitably affixed to the substrate either directly or through any suitable intermediate structures. The flexible skin structure 1100 includes a plurality of fluid pockets also shown as 1102 corresponding to texture features. The fluid pockets 1102 are in fluid communication with the fluid channels 1106 to allow fluid to be added to or removed from the chamber to actuate or deactuate the respective texture feature.

In one example, as noted above, fluid pumps may be controlled via control logic. In another embodiment, the pumps may be activated via mechanical movement of a movable portion of the housing, such as a movement of a clam shell such that, for example, the rotational movement of a housing portion causes the fluid to be pumped into the fluid chambers. In one example, the pump is controlled to reverse fluid flow when the flip portion is closed. As such, there may be a fluid pump operative to move fluid into the fluid passages (and out of the passages) and a movable housing portion that is coupled with the fluid pump such that mechanical movement of the housing portion causes the fluid pump to pump fluid in at least one fluid passage. The movement of the movable housing portion in another direction may serve to remove fluid from the one or more respective chambers and return it to an internal reservoir.

Figure 14:
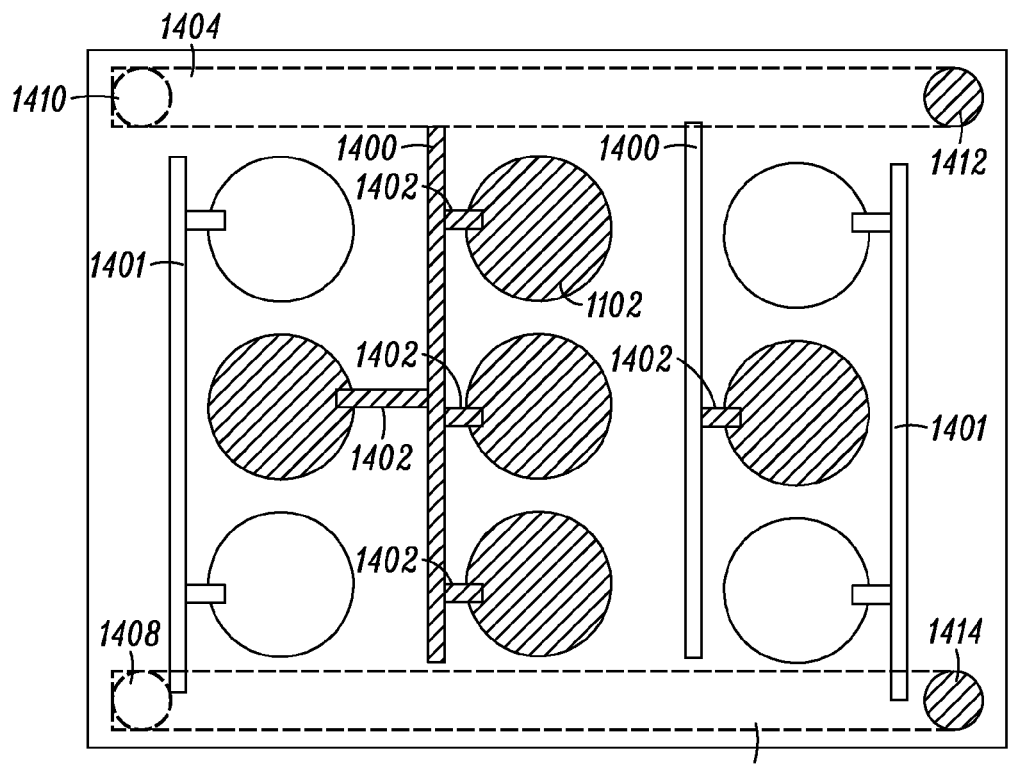
FIG. 14 is a top view illustrating a portion of a portable electronic device that employs an embodiment of a controllable skin texture surface.

FIG. 14 illustrates another embodiment of a hydraulic actuation structure and flexible skin structure that in this example, shows fluid channels 1400 with additional fluid channels 1402 connected with specific chambers that are molded into a rear surface of the flexible skin structure 1100. The flexible skin structure includes multiple features wherein movement of each of the features is controlled independently. The fluid channels 1400 are in fluid communication with the manifold 1404 whereas other chambers 1401 are in fluid communication with manifold 1406. As also shown, suitable pump inlets 1408 and 1410 are shown that are in fluid communication with pumps (not shown). In this manner, each pump can provide a different fluid pressure to each pump inlet 1408, 1410 in order to raise the respective fluid chambers 1102 to different relative heights. In addition, light sources 1412 and 1414 are positioned in proximity to the respective manifold 1404 and 1406 to serve as a light source (such as one or more colored LEDs) and a clear fluid may be used to act as a light guide to direct the light from the internal light sources to, for example, translucent flexible portions of the flexible skin structure. Alternatively, the fluid itself may be colored so as to make the raised texture elements visually distinct by the change in color due to the color fluid contained therein. Any other suitable combination may also be employed if desired. The light sources may be suitably controlled to turn on and off as desired based on an incoming call, user programmed sequence, be activated by a ring tone, or may be controlled in any other suitable manner by the control logic.

Figure 15:
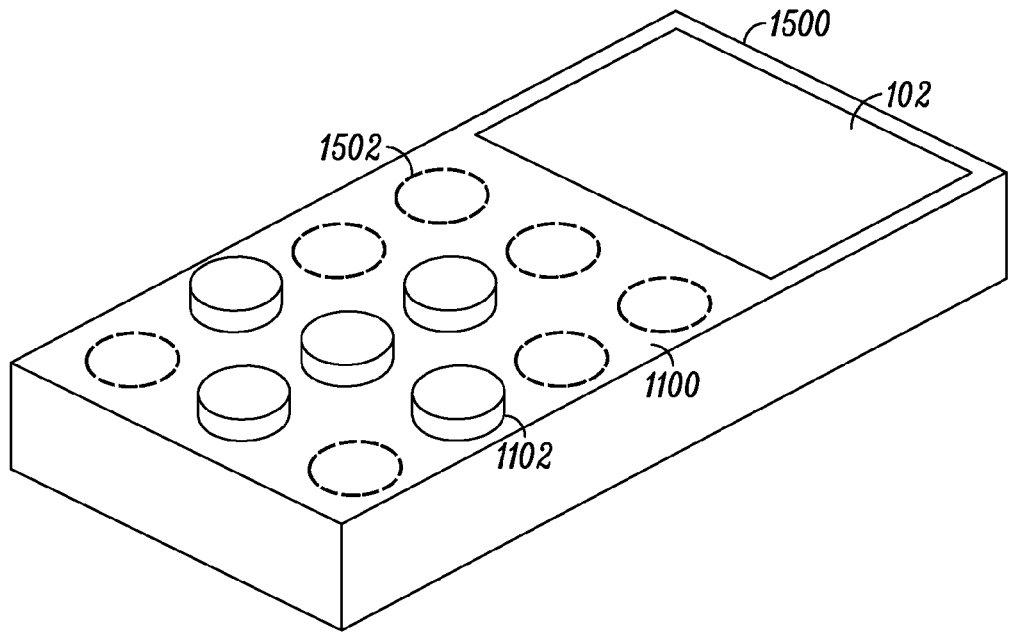
FIG. 15 is a perspective view of a portable electronic device with a controllable skin texture surface in accordance with one embodiment.

FIG. 15 illustrates one example of the portable electronic device 1500 with the appearance of a 3D pattern with five tactile surfaces being actuated. Unactuated portions 1502 are shown to be flat in this particular example.

Figure 16:
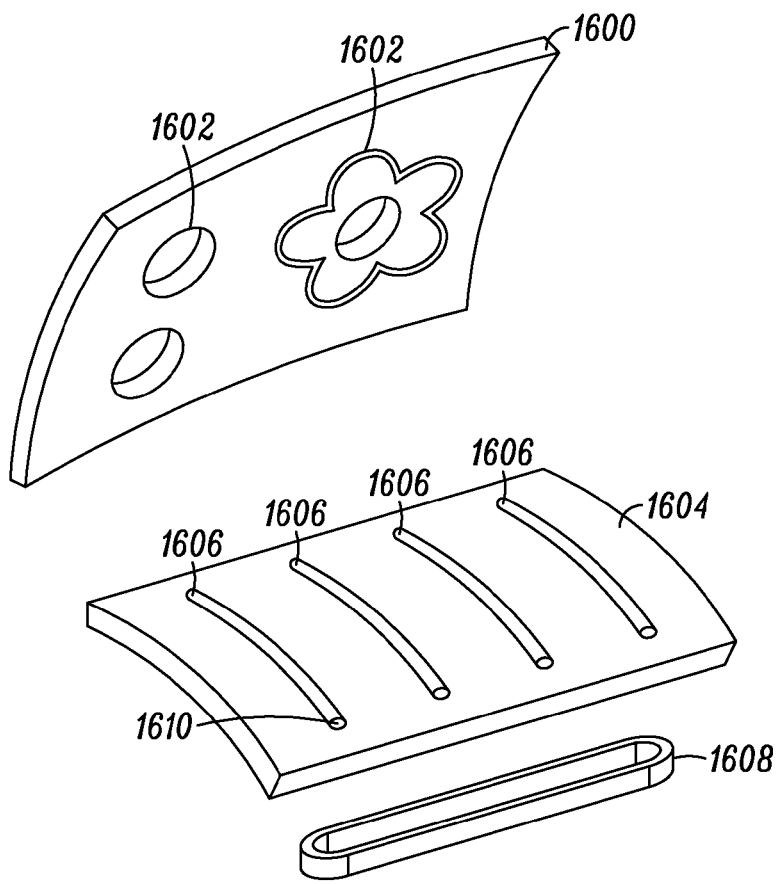
FIG. 16 is a perspective view illustrating one example of a flexible skin structure and corresponding portion of a hydraulic actuation structure in accordance with one example set forth in disclosure.

FIG. 16 illustrates an alternative embodiment wherein the flexible skin structure 1600 includes molded pocket patterns 1602 in an under portion thereof to receive fluid. A rigid substrate 1604 includes the suitably positioned fluid channels 1606 that are in fluid communication with one or more manifolds 1608 and also include a pump inlet. The manifold 1608 is attached to a rear side of the right substrate 1604 and is in fluid communication with channels 1606 through openings 1610. Each of the microchannels include, for example, openings 1610 to allow fluid to pass from the manifold into the channel 1606 as described above. One or more pumps may also be used as noted above to raise and lower the pattern 1602 by passing fluid in or out of the channel 1606. As such, in this example, if the pattern 1602 is placed, for example, on the back of a cell phone or on the face of a cell phone, the outer skin of the cell phone may be activated to give a three dimensional texture that may be suitably activated and deactivated as desired. The channels 1606 may be positioned with sufficiently fine spacing that they provide any suitable texture pattern to be actuated. It will also be recognized that the skin texture may have one or more cover layers to protect the skin texture from damage from ultraviolet radiation, physical scratches, or any other potential hazards.

Figure 17:
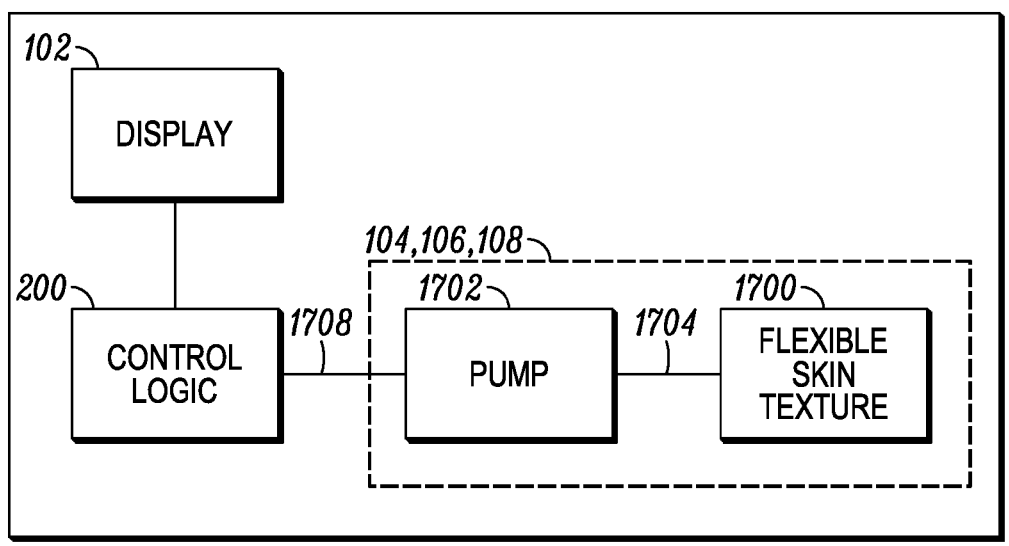
FIG. 17 is a block diagram illustrating the portion of a portable electronic device in accordance with one example.

FIG. 17 is a block diagram illustrating one example of the structure 1700 for controlling the hydraulic controllable skin texture surface examples noted above. The device may include one or more fluid pumps 1702 which provide fluid 1704 to and from the controllable skin texture surface. Control logic, in one example, shown as 200 provides suitable control information 1708 in the form of analog or digital signals, for example, to control the one or more fluid pumps 1702 to provide the fluid 1704 in a controlled manner to actuate and deactuate one or more portions of a flexible skin to provide a three dimensional tactile configuration as desired. As previously noted, each pump 1702 can be controlled to provide a different fluid pressure to each fluid chamber 1102 to raise the chambers to different relative heights. It will also be recognized that instead of a fluid, a pressurized gas could be employed.

Figure 18A:
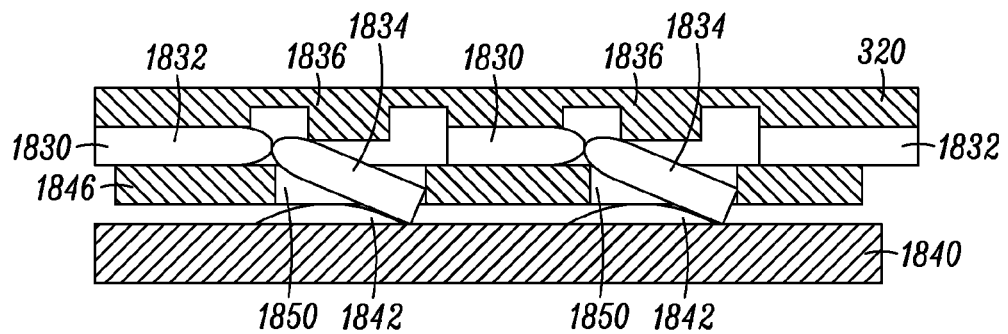
FIGS. 18a-18b illustrate a cross sectional view of an embodiment employing a flexible sliding plate in accordance with one embodiment of the invention.
Figure 18B:
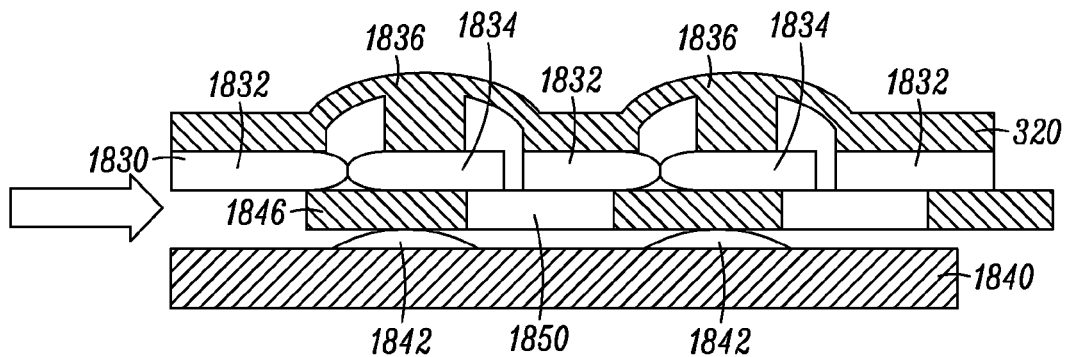

FIGS. 18a-18b illustrate another embodiment wherein, instead of a sliding ramp structure (for example as shown in FIGS. 6-7), a plurality of hinged elements 1830 that have an anchored portion 1832 attached to the flexible skin structure 320 through a suitable adhesive or through any other suitable attachment mechanism. Each of the hinged elements 1830 also have a movable section 1834. The flexible skin structure 320 includes pins 1836 which are, for example, longer than those shown in FIG. 6.

The device further includes a substrate 1840 such as, for example, a printed circuit board which has attached thereto, dome switches 1842 as known in the art. The dome switches 1842 are positioned to align under the pins. A flexible sliding member 1846 is interposed between the substrate 1840 and the anchored portion 1832 underneath the flexible skin surface 320. The flexible sliding member 1846 may be made from, for example, nylon or polypropylene sheet, or other suitably flexible material that allows motion of the movable section of the hinged element 1834 to be transferred to the dome switch 1842. Holes 1850 in the flexible sliding member 1846 allow the movable sections of hinged elements 1834 to rotate downward toward the substrate 1840, as shown in FIG. 18a. It can be seen that when the flexible sliding member 1846 is in the position shown in FIG. 18a, the end of the movable section of the hinged element 1834 may be designed so as to come in contact with the substrate 1840 such that pressing the flexible surface 320 will not actuate the dome switch 1842.

As shown in FIG. 18b, the flexible sliding member 1846 is moved, as described above based on any suitable structure to activate and in this case, raise portions of the flexible skin structure 320. However, since the material is compressible, when a user presses on a top surface of the flexible skin structure 320, the pin causes the moving portion 1834 to press down upon the flexible material of the flexible sliding member 1846 and depress the dome switch 1842. As such, in this embodiment, a user may activate the dome switch only when the flexible skin texture is actuated. It will be recognized that the geometry of the movable section of the hinged element 1834 may also be designed such that the dome switch may be actuated by pressing the flexible skin 320 whether the skin is in either the actuated or unactuated state (FIGS. 18b and 18a, respectively). Among other advantages, this embodiment may allow the flexible sliding member 1846 to be stamped rather than, for example, molded and also uses conventional dome switches in combination thereby providing a potentially lower cost structure. The hinged elements 1830 may be made of any suitable material such as nylon, polypropylene sheet or any other suitable material as desired. As also noted above, the flexible sliding member may be configured as a sliding member that slides along rails formed in a housing or other structure or may be configured in any other suitable manner as desired.

Figure 19:
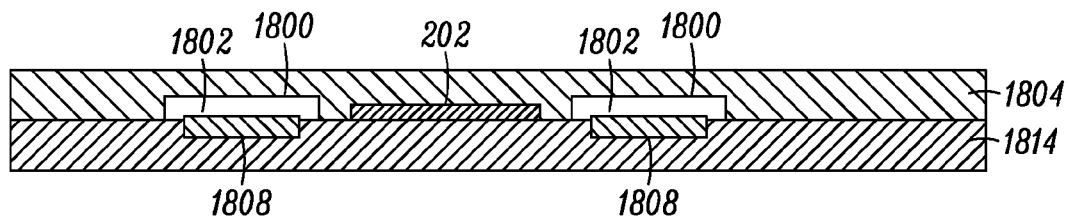
FIGS. 19-20 illustrate cross sectional views of another example of a gas expandable actuation structure and flexible skin structure in accordance with one example.
Figure 20:
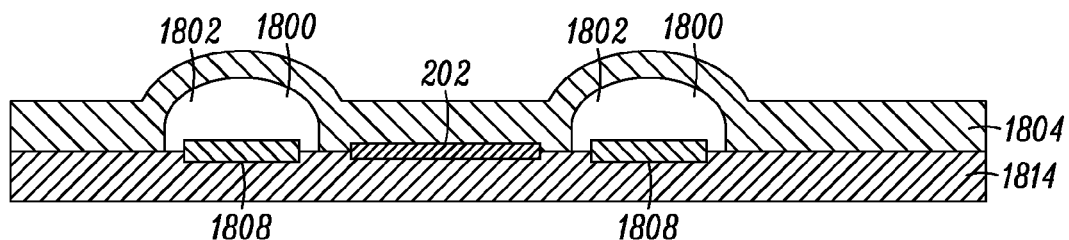

FIGS. 19-20 illustrate another example of a controllable skin texture surface structure that employs an expandable gas actuation structure to raise and lower desired portions of a flexible skin structure to provide a controllable tactile surface of a portable electronic device. As shown in FIG. 18, a skin texture surface actuation structure includes an expandable gas actuation structure that includes a gas therein 1802 such as air, or a material such as Freon or alcohol that changes from liquid to gas at a specified temperature and pressure, and a flexible skin structure 1804 such as the type described above. The expandable gas actuation structure includes a gas chamber 1800 that is thermally coupled to a heating element 1808 such as an electrical resistor, or any other suitable structure, that may be turned on and off by control logic as desired to heat the gas 1802 within the chamber 1800 and cause the gas to expand. The expansion of the gas 1802 causes the gas to expand and fill the chamber 1800 of the flexible skin structure 1804. When the heating element 1808 is turned off, the gas cools and the chamber 1800 collapses to put the flexible skin structure in an unactuated state. As such, the flexible skin structure 1804, as also described above, includes pockets corresponding to desired texture features wherein the pockets or chambers are molded into the reverse surface or an undersurface of the flexible skin structure 1804. The flexible skin structure 1804 is attached to a substrate 1814 as described above, which may be part of the housing of the device or any other structure. It is bonded so as to provide a sealed environment so that the gas 1802 in the chamber 1800 cannot escape the chamber 1800. When an electric current is sent through the heating element 1808, the increased temperature causes the trapped gas in the pockets to expand thereby raising the pocket or outer surface over the chamber 1810. The flexible skin structure includes expandable portions (e.g., pockets) that define a plurality of gas chambers. Each of the gas chambers includes a controllable heating element that may be activated together or individually.

The substrate 1814 includes a heating element(s) 1808 corresponding to each respective texture element. In addition, as noted above, all of the examples described herein may include one or more touch sensors 202 which may be used in any suitable manner. FIG. 19 shows a deactivated state of the flexible skin texture and FIG. 20 shows an activated state of the flexible skin structure 1804.

Figure 21:
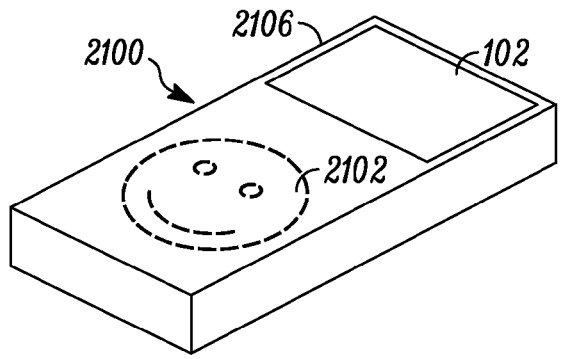
FIGS. 21-22 illustrate a perspective view of a portable electronic device with a deactuated and actuated controllable skin texture surface.
Figure 22:
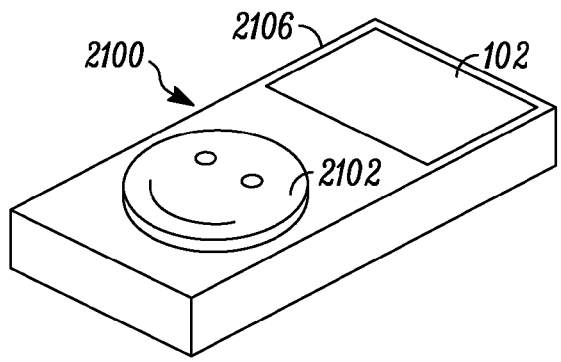

FIGS. 21-22 diagrammatically illustrate one example of a controllable skin texture surface 2102 with a particular pattern 2102 that may be activated and nonactivated using one or more of the above described actuation structures based on any suitable condition. In this example, the tactile configuration or pattern 2102 may simply be located on an outer surface of the portable electronic device 2106 and need not be part of a user interface but instead provides a unique visual experience and tactile experience for a user.

Figure 23:
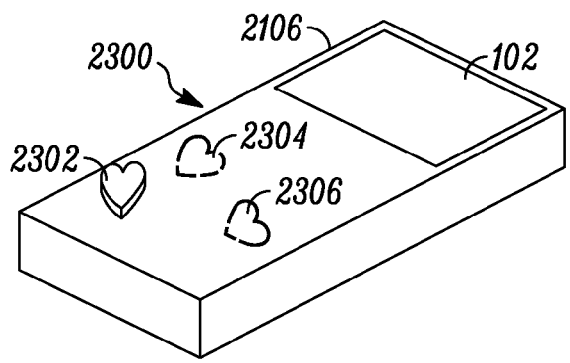
FIGS. 23-25 illustrate a perspective view of a portable electronic device illustrating different portions of a controllable skin texture being actuated and deactuated in accordance with one example disclosed below.
Figure 24:
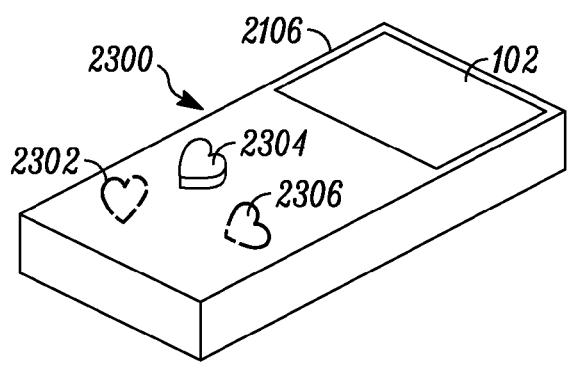
Figure 25:
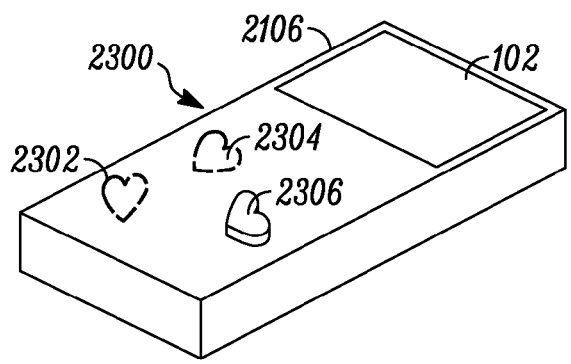

FIGS. 23-25 illustrate yet another example of controlling of a controllable skin texture surface 2300 (here shown as multiple hearts) of the types described above wherein a different portion 2302-2306 is activated at different points in time by control logic to give a visual appearance or tactile feel of a moving object. In this example, a "heart" in the pattern is activated at different times. Also, animation of texture, such as variations in surface texture over time, may be used to animate a character or feature. It will be recognized that the above description and examples are merely for illustrative purposes only and that any suitable configurations, designs or structures may be employed as desired.

Figure 26:
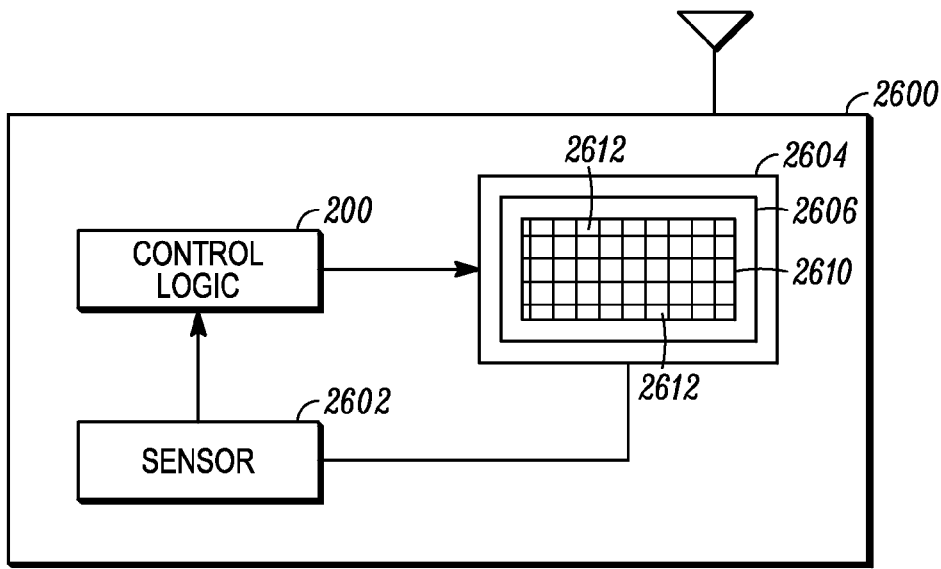
FIG. 26 illustrates a functional block diagram of one example of controlling a controllable skin texture surface.

FIG. 26 illustrates a functional block diagram of a device 2600 such as a wireless phone, a laptop computer, a portable Internet appliance, a portable digital media player, a personal digital assistant, or any other suitable portable electronic device. The device 2600 includes control logic 200 that is operatively coupled to a sensor 2602 and to a tactile morphing keypad 2604. The tactile morphing keypad 2604 includes a controllable skin texture surface 2606. The sensor 2602 includes one or more sensors such as capacitance sensors, resistive sensors, pressure sensors, and/or any other suitable touchpad sensors. In this example, the controllable skin texture surface 2606 defines a keypad 2610 having a plurality of keys 2612. The keypad 2610 can be any suitable keypad such as an alphanumeric keypad, a QWERTY keypad, or any other suitable keypad having a plurality of keys. The keypad 2610 can be printed on the controllable skin texture surface 2606 or otherwise displayed in any suitable manner.

During operation, a user can navigate the keypad 2610 with a finger, stylus, and/or any other suitable pointing element. The sensor 2602 senses a proximity of the pointing element to a particular key of the keypad 2610 (e.g., the key the user wishes to select) based on a user input such as presence of a finger, stylus, and/or any other suitable pointing element. The control logic 200 controls the controllable skin texture surface 2606 in response to the sensor 2602 sensing the proximity of the pointing element to the particular key. More specifically, the control logic 200 controls the controllable skin texture surface 2606 to adjust a height of at least a portion of controllable skin texture surface 2606 that corresponds to the particular key. In this manner, the particular key can move closer in proximity to the pointing element, which can aid the user in selecting the particular key of the keypad 2610. In some embodiments, the particular key can include a depressed portion (e.g., a divot) to aid the user in selecting the particular key with the pointing element.

In addition, in some embodiments, the control logic 200 controls the controllable skin texture surface 2606 to adjust a height of at least a second portion of the controllable skin texture surface 2606 corresponding to at least one key of the keypad 2610 that is adjacent to the particular key in response to the sensor 2602 sensing the proximity of the pointing element to the particular key. The second portion corresponding to the adjacent key and the portion corresponding to the particular key can have a different height with respect to each other. For example, in some embodiments, the portion corresponding to the particular key can protrude higher than second portion that corresponds to the adjacent key. In this manner, adjacent keys are moved closer in proximity to the user, but not as close as the particular key, which aids the user in navigating to adjacent keys more efficiently. In addition, in some embodiments, the second portion corresponding to the adjacent key can protrude higher than the portion corresponding to the particular key creating a recess to aid the user in selecting the particular key with the pointing element.

In some embodiments, the control logic 200 can control the tactile morphing keypad 2604 to adjust visual characteristics desired and adjacent keys with respect to each other and other keys of the keypad. Exemplary visual characteristics that can be adjusted include brightness, size, color, shape, font and/or any other suitable visual characteristic. For example, the particular key can be visually enlarged with respect to the adjacent key, which can be visually enlarged with respect to the other keys of the keypad 2610.

The sensor 2602 can sense the user navigating the keypad 2610 and the user selecting a particular key based on a characteristic change in the tactile morphing keypad 2604. The characteristic change can be any suitable change in the tactile morphing keypad 2604 such as a change in capacitance, a change in resistance, a change in force applied by the user, and/or any other suitable characteristic change. In some embodiments, the sensor 2602 senses the selected key when the characteristic change is greater than a predetermined threshold and senses the particular key when the characteristic change is less than the predetermined threshold.

In some embodiments, the tactile morphing keypad 2604 can provide user feedback such as auditory feedback, tactile feedback, and/or any other suitable user feedback when the user selects the particular key. For example, the tactile morphing keypad 2604 can include the dome switches 1842 to provide the user feedback.

When the user selects the particular key, the control logic 200 controls the controllable skin texture surface 2606 to lower (or raise in some embodiments) the protruding (or recessed) portion of controllable skin texture surface 2606 corresponding to the particular and/or adjacent key. In addition, in some embodiments, the control logic 200 adjusts visual characteristics of the tactile morphing keypad 2604 when the user selects the particular key.

Figure 27:
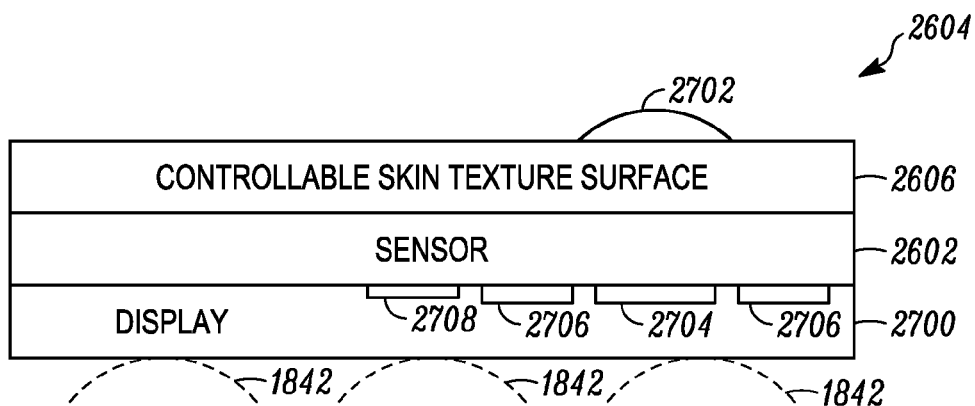
FIG. 27 illustrates one example of a tactile morphing keypad that includes the controllable skin texture surface.

FIG. 27 illustrates one example of the tactile morphing keypad 2604. In this example, the tactile morphing keypad 2604 includes the controllable skin texture surface 2606, the sensor 2602, and a display 2700 for displaying the keypad 2610. As shown, the controllable skin texture surface 2616 overlays the keypad display 2700 in this example. In addition, as noted above, the tactile morphing keypad 2604 can include the dome switches 1842 to provide user feedback when the particular key is selected.

The control logic 200 controls at least a portion 2702 of the controllable skin texture surface 2606 to protrude (i.e., raise) and/or lower in response to the sensor sensing the proximity of the pointing element to a particular key 2704 and/or selecting the particular key 2704. For example, if the user is navigating the keypad 2610 with the pointing element, the portion 2702 of the controllable skin surface 2606 corresponding to the particular key 2704 protrudes (or recesses in some embodiments). However, if the user selects the particular key 2704, the portion 2702 of the controllable skin texture surface 2606 that is protruding (or recessed) can lower (or raise).

In some embodiments, the control logic 200 adjusts visual characteristics of the keypad 2610. For example, if the user is navigating the keypad 2610 with the pointing element, visual characteristics of the particular key 2704 and adjacent keys 2706 are adjusted with respect to each other and with respect to other keys 2708 of the keypad 2610. In addition, if the user selects the particular key 2704 with the pointing element, the visual characteristics of the selected key and/or adjacent keys can be further adjusted.

Figure 28:
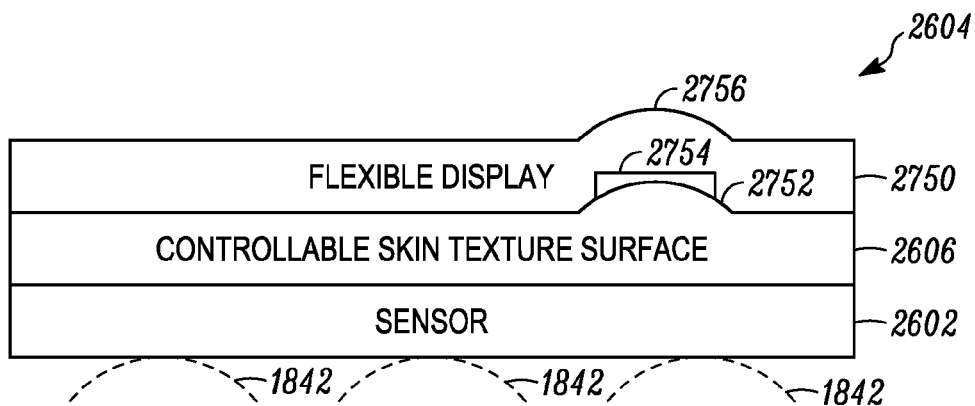
FIG. 28 illustrates another example of a tactile morphing keypad that includes the controllable skin texture surface.

FIG. 28 illustrates another example of the tactile morphing keypad 2604. In this example, the tactile morphing keypad 2604 includes the controllable skin texture surface 2606, the sensor 2602, and a flexible display 2750 for displaying the keypad 2610. The flexible display 2750 can be any known flexible display such as an electrophoretic display or any other suitable flexible display. As shown, the controllable skin texture surface 2606 underlays the flexible display 2750 in this example. In addition, the tactile morphing keypad 2604 can include the dome switches 1842 to provide user feedback when the particular key is selected.

The control logic 200 controls at least a portion 2752 of the controllable skin texture surface 2606 to protrude (i.e., raise) and/or lower in response to the sensor sensing the proximity of the pointing element to the particular key 2754 and/or selecting the particular key 2754. For example, if the user is navigating the keypad 2610 with the pointing element, the portion 2752 of the controllable skin surface 2606 corresponding to the particular key 2754 protrudes (or recesses in some embodiments). However, if the user selects the particular key 2754 with the pointing element, the portion 2752 of the controllable skin texture surface 2606 that is protruding (or recessed) can lower (or raise). The protruding portion 2752 causes the flexible display 2750 to protrude at a corresponding location 2756. In addition, the control logic 200 can also adjust visual characteristics of the keypad 2610.

Figure 29:
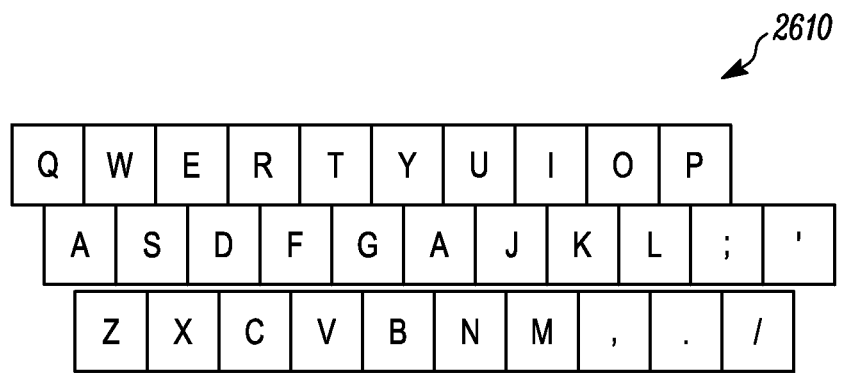
FIG. 29 illustrates one example of a keypad displayed by a tactile morphing keypad when a user input is not navigating the keypad.
Figure 30:
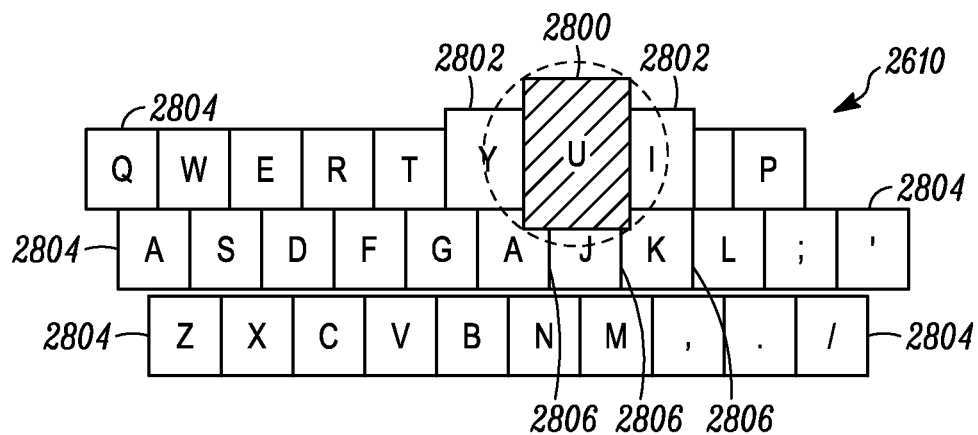
FIG. 30 illustrates one example of adjusting visual characteristics of the keypad when the user input is navigating the keypad.
Figure 31:
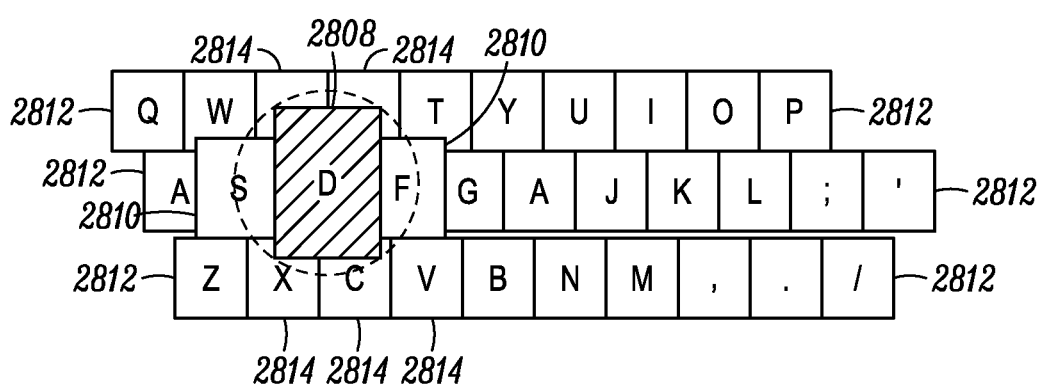
FIG. 31 illustrates another example of adjusting visual characteristics of the keypad when the user input is navigating the keypad.

FIGS. 29-31 illustrate examples of the control logic 200 adjusting visual characteristics of the keypad 2610. FIG. 29 illustrates one example of the keypad 2610 displayed by the display 2700 when the user is not navigating the keypad 2610.

FIG. 30 illustrates one example of the control logic 2610 adjusting visual characteristics of the keypad 2610. In this example, the sensor 2602 senses proximity of the pointing element to a particular key 2800 based on the user input. The control logic 200 controls the display 2700 to adjust visual characteristics of the keypad 2610 in response to the sensor 2602 sensing the particular key 2800. More specifically, the display 2700 adjusts visual characteristics of the particular key 2800 with respect to adjacent keys 2802. In addition, the display 2700 adjusts visual characteristics of the adjacent keys 2802 with respect to other keys 2804 of the keypad 2610. Although not illustrated in this example, other adjacent keys 2806 can also be visually adjusted.

In this example, the display 2700 enlarges the particular key 2800 and the adjacent keys 2802. More specifically, the display enlarges the particular key 2800 to be larger than the adjacent keys 2802 and enlarges the adjacent keys 2802 to be larger than the other keys. Although the visual characteristic adjusted is size in this example, skilled artisans will appreciate that other visual characteristics may be adjusted such as brightness, color, font, or other suitable visual characteristics.

FIG. 31 illustrates another example of the control logic 2610 adjusting visual characteristics of the keypad 2610. In this example, the sensor 2602 senses proximity of the pointing element to a particular key 2808 based on the user input. The sensor 2602 controls the display 2700 adjusts visual characteristics of the keypad 2610 in response to the sensor 2602 sensing the particular key 2808. More specifically, the display 2700 to adjust visual characteristics of the particular key 2808 with respect to adjacent keys 2810. In addition, the display 2700 adjusts visual characteristics of the adjacent keys 2810 with respect to other keys 2812 of the keypad 2610. Although not illustrated in this example, other adjacent keys 2814 can also be visually adjusted.

In this example, the display 2700 enlarges the particular key 2808 and the adjacent keys 2810. More specifically, the display enlarges the particular key 2808 to be larger than the adjacent keys 2810 and enlarges the adjacent keys 2810 to be larger than the other keys. Although the visual characteristic adjusted is size in this example, skilled artisans will appreciate that other visual characteristics may be adjusted such as brightness, color, font, or other suitable visual characteristics.

Figure 32:
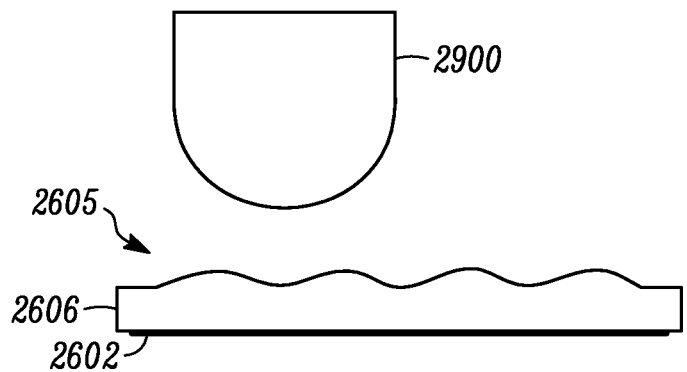
FIG. 32 illustrates one example of the tactile morphing keypad when the user input not navigating the keypad.
Figure 33:
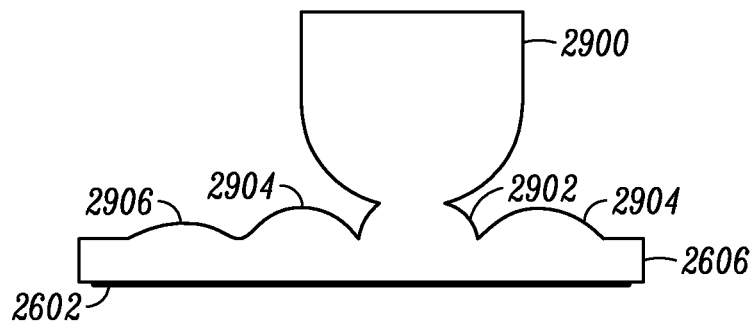
FIG. 33 illustrates one example of the tactile morphing keypad when the user input is navigating the keypad.
Figure 34:
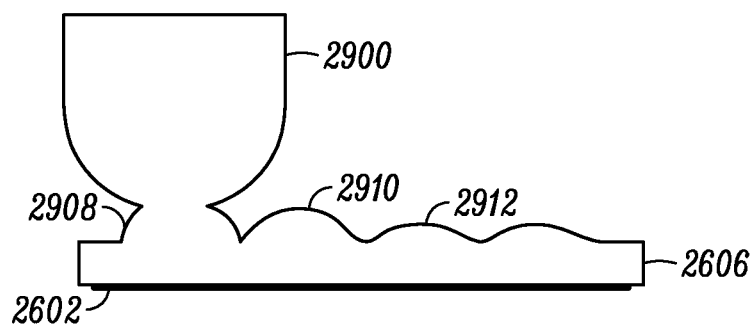
FIG. 34 illustrates another example of the tactile morphing keypad when the user input is navigating the keypad.

FIGS. 32-34 illustrate examples of the control logic 200 controlling tactile characteristics of the keypad 2610. FIG. 32 illustrates one example of the tactile morphing keypad 2604 when a pointing element 2900 is not navigating the keypad 2610.

FIG. 33 illustrates one example of the control logic 2610 controlling the controllable skin texture surface 2606 of the tactile morphing keypad 2604. In this example, the sensor 2602 senses proximity of the pointing element 2900 to a particular key 2902 based on the user input. The control logic 200 controls the controllable skin texture surface 2606 in response to the sensor 2602 sensing the particular key 2902. More specifically, the control logic 200 controls at least a portion of the controllable skin texture surface 2606 corresponding with the particular key 2902 to protrude (or recess in some embodiments). In addition, in this example, the control logic 200 controls at least a second portion of the controllable skin texture 2606 corresponding with adjacent keys 2904 to protrude (or recess). Although other configurations are possible, the particular key 2902 protrudes higher than the adjacent keys 2904 and the adjacent keys 2904 protrude higher than other keys 2906 of the tactile morphing keypad 2604 in this example.

FIG. 34 illustrates another example of the control logic 2610 controlling the controllable skin texture surface 2606 of the tactile morphing keypad 2604. In this example, the sensor 2602 senses proximity of the pointing element 2900 to a particular key 2908 based on the user input. The control logic 200 controls at least a portion of the controllable skin texture surface 2606 corresponding with the particular key 2908 to protrude (or recess). In addition, in this example, the control logic 200 controls at least a second portion of the controllable skin texture 2606 corresponding with adjacent keys 2910 to protrude (or recess). Although other configurations are possible, the particular key 2908 protrudes higher than the adjacent keys 2910 and the adjacent keys 2910 protrude higher than other keys 2912 of the tactile morphing keypad 2604 in this example.

Figure 35:
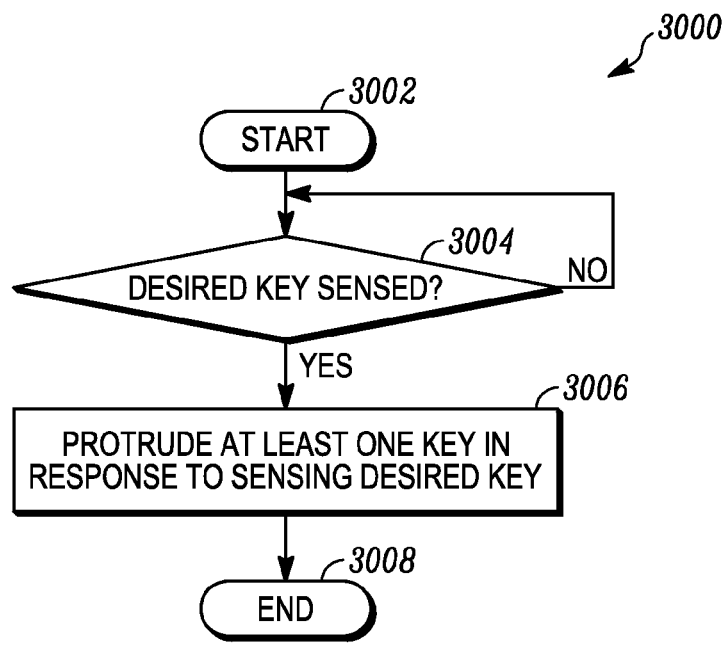
FIG. 35 is a flowchart depicting exemplary steps that can be taken to control the controllable skin texture surface defining the keypad.

Referring now to FIG. 35, exemplary steps that can be taken to control the controllable skin texture surface 2606 defining the keypad 2610 are generally identified at 3000. The process starts in step 3002 when the device 2600 is powered on. In step 3004, the sensor 2602 senses whether the pointing element 2900 is proximate to a particular key (e.g., the key the user desires to select). If the sensor 2602 does not sense that the pointing element 2900 is proximate to a particular key, the process returns to step 3004. However, if the sensor 2602 senses that the pointing element 2900 is proximate to a particular key, the control logic 200 controls at least one key of the keypad 2610 to protrude (or recess) in response to the sensor 2602 sensing the pointing element 2900 proximate to the particular key in step 3006. The process ends in step 3008.

Figure 36:
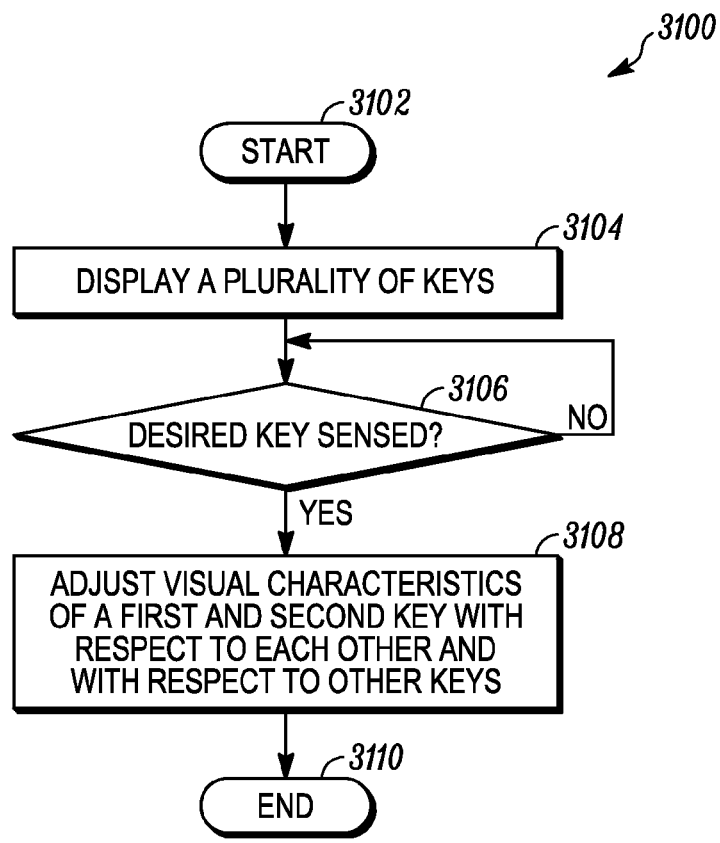
FIG. 36 is a flowchart depicting exemplary steps that can be taken to adjust visual characteristics of the keypad.

Referring now to FIG. 36, exemplary steps that can be taken to adjust visual characteristics of the keypad 2610 are generally identified at 3100. The process starts in step 3102 when the device 2600 is powered on. In step 3104, the display 2700 displays the keypad 2610. In step 3106, the sensor 2602 determines whether the pointing element 2900 is proximate to a particular key. If the sensor 2602 does not sense that the pointing element 2900 is proximate to a particular key (e.g., the key the user desires to select), the process returns to step 3106. However, if the sensor 2602 senses that the pointing element 2900 is proximate to a particular key, the control logic 200 adjusts visual characteristics of a first key and an adjacent second key with respect to each other and with respect to other keys of the keypad 2610 in response to the sensor 2602 sensing proximity of the pointing element 2900 to the particular key in step 3108. The process ends in step 3110.

Figure 37:
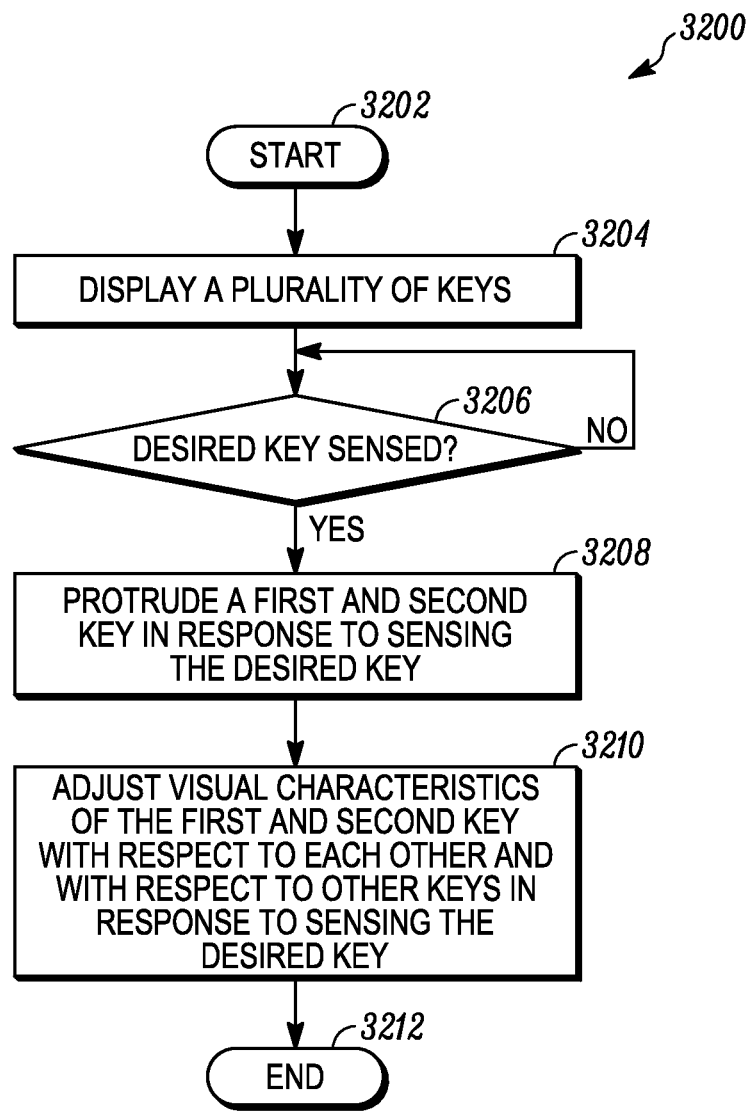
FIG. 37 is a flowchart depicting exemplary steps that can be taken to control the tactile morphing keypad.

Referring now to FIG. 37, exemplary steps that can be taken to control the tactile morphing keypad 2604 are generally identified at 3200. The process starts in step 3202 when the device 2600 is powered on. In step 3204, the display 2700 displays the keypad 2610. In step 3206, the sensor 2602 senses whether the pointing element 2900 is proximate to a particular key of the keypad 2610. If the sensor 2602 does not sense that the pointing element 2900 is proximate to a particular key, the process returns to step 3206. However, if the sensor 2602 senses that the pointing element 2900 is proximate to a particular key, the control logic 200 controls the controllable skin texture surface 2606 to protrude (or recess in some embodiments) a first and an adjacent second key in response to sensing the proximity of the pointing element 2900 to the particular key in step 3208. In step 3210, the control logic 200 adjusts visual characteristics of the first and second key with respect to each other and with respect to other keys of the keypad 2610. The process ends in step 3212.

Among other advantages, a portable electronic device includes a tactile morphing keypad to move a particular key closer in proximity to a user input such as a finger or stylus, which aids a user in selecting the particular key of a keypad. In addition, adjacent keys are moved closer in proximity to the user input, but not as close as the particular key, which aids the user in navigating to adjacent keys more efficiently. Furthermore, visual characteristics of the desired and adjacent keys are adjusted with respect to each other and with respect to other keys to aid the user in selecting the particular key and navigating the keypad more efficiently. Other advantages will be recognized by those of ordinary skill in the art.

The above detailed description of the invention, and the examples described therein, has been presented for the purposes of illustration and description. While the principles of the invention have been described above in connection with a specific device, it is to be clearly understood that this description is made only by way of example and not as a limitation on the scope of the invention.

What is claimed is:

1. A device, comprising:
a controllable skin texture surface defining a keypad;
a proximity sensor that is operative to sense a proximity of a pointing element to a particular key of the keypad based on a user input;
control logic, operatively coupled to the sensor and the controllable skin texture surface, that is operative to adjust a height of the particular key with respect to another key of the keypad in response to the sensor sensing the proximity of the pointing element to the particular key; and
wherein the control logic is operative to adjust a height of a second key of the keypad with respect to other keys of the keypad and with respect to the particular key in response to the sensor sensing the proximity of the pointing element to the particular key, wherein the second key is adjacent to the particular key.

2. The device of claim 1 wherein the control logic controls the particular key to protrude in response to the proximity sensor sensing the proximity of the pointing element to the particular key.

3. The device of claim 1 wherein the particular key protrudes higher that the second key.

4. The device of claim 1 wherein the control logic is operative to adjust visual characteristics of the particular key and the second key with respect to other keys of the keypad.

5. The device of claim 4 wherein the control logic is operative to adjust the visual characteristics by at least one of brightness, size, color, shape, and font.

6. The device of claim 1 wherein the proximity sensor is operative to sense whether the particular key has been selected based on the user input, the control logic is operative to adjust at least one of the height of the particular key and the height of the second key when the particular key has been selected, and the keypad is operative to provide user feedback that is at least one of auditory and tactile when the particular key has been selected.

7. A method, comprising:
displaying a plurality of keys;
sensing, by a proximity sensor, a proximity of a pointing element to a particular key of the plurality of keys based on a user input; and
adjusting a first height of the particular key and a second height of an adjacent key in response to the sensor sensing the proximity of the pointing element to the particular key; and
adjusting visual characteristics of the particular key and the second key with respect to each other and with respect to other keys of the plurality of keys in response to the sensor sensing the proximity of the pointing element to the particular key.

8. The method claim 7 wherein the first height and second height are adjusted to protrude from the controllable skin texture surface.

9. The method of claim 8 wherein the particular key protrudes higher than the adjacent key and wherein the particular key is visually larger than the adjacent key and the adjacent key is visually larger than the other keys.

10. The method of claim 7 wherein the visual characteristics are adjusted by at least one of brightness, size, color, shape, and font.

11. The method of claim 7 further comprising sensing whether the particular key has been selected based on the user input.

12. The method of claim 11 further comprising adjusting at least one of the first and second height when the particular key has been selected.

13. The method of claim 11 further comprising providing user feedback that is at least one of auditory and tactile when the particular key has been selected.

14. A device, comprising:
a controllable skin texture surface defining a keypad;
a proximity sensor that is operative to sense a proximity of a pointing element to a particular key of the keypad based on a user input;
control logic, operatively coupled to the sensor and the controllable skin texture surface, that is operative to adjust a height of the particular key with respect to another key of the keypad in response to the sensor sensing the proximity of the pointing element to the particular key; and
wherein the control logic controls the particular key to protrude in response to the sensor sensing the proximity of the pointing element to the particular key.

* * * * *

UNITED STATES PATENT AND TRADEMARK OFFICE
CERTIFICATE OF CORRECTION

PATENT NO. : 8,866,641 B2
APPLICATION NO. : 12/274019
DATED : October 21, 2014
INVENTOR(S) : Michael E. Caine et al.

It is certified that error appears in the above-identified patent and that said Letters Patent is hereby corrected as shown below:

In the Claims

In column 20, line 52, in claim 8, after "method" insert -- of --.

Signed and Sealed this
Tenth Day of March, 2015

Michelle K. Lee
*Deputy Director of the United States Patent and Trademark Office*